(12) United States Patent
Kim et al.

(10) Patent No.: US 11,537,248 B2
(45) Date of Patent: *Dec. 27, 2022

(54) TOUCH SENSOR PANEL AND TOUCH INPUT DEVICE WITH REDUCED MAGNITUDE OF LOW GROUND MASS INTERFERENCE SIGNAL

(71) Applicant: HiDeep Inc., Seongnam-si (KR)

(72) Inventors: Seyeob Kim, Seongnam-si (KR); Bonkee Kim, Seongnam-si (KR); Jongsik Kim, Seongnam-si (KR); Sein Lee, Seongnam-si (KR)

(73) Assignee: HiDeep Inc.

(*) Notice: Subject to any disclaimer, the term of this patent is extended or adjusted under 35 U.S.C. 154(b) by 0 days.

This patent is subject to a terminal disclaimer.

(21) Appl. No.: 17/263,770

(22) PCT Filed: Jul. 31, 2019

(86) PCT No.: PCT/KR2019/009545
§ 371 (c)(1),
(2) Date: Jul. 9, 2021

(87) PCT Pub. No.: WO2020/027576
PCT Pub. Date: Feb. 6, 2020

(65) Prior Publication Data
US 2021/0349572 A1   Nov. 11, 2021

(30) Foreign Application Priority Data

Aug. 3, 2018  (KR) .................. 10-2018-0090991
Mar. 13, 2019  (KR) .................. 10-2019-0028926

(51) Int. Cl.
*G06F 3/044*       (2006.01)
*G06F 3/041*       (2006.01)

(52) U.S. Cl.
CPC .......... *G06F 3/0445* (2019.05); *G06F 3/0416* (2013.01); *G06F 3/0446* (2019.05); *G06F 3/0448* (2019.05)

(58) Field of Classification Search
CPC .... G06F 3/0416; G06F 3/0445; G06F 3/0446; G06F 3/0448
See application file for complete search history.

(56) References Cited

U.S. PATENT DOCUMENTS

2013/0181942 A1    7/2013  Bulea et al.
2015/0277655 A1*  10/2015  Kim ...................... G06F 3/0412
                                                                       345/174

(Continued)

FOREIGN PATENT DOCUMENTS

KR       20150114405       10/2015

*Primary Examiner* — Liliana Cerullo
(74) *Attorney, Agent, or Firm* — The Belles Group, P.C.

(57) ABSTRACT

A touch sensor panel according to the present invention includes: a plurality of first electrodes and a plurality of second electrodes, in which a touch window area includes a first number of consecutive first electrodes in a first direction among the plurality of first electrodes and a second number of consecutive second electrodes in a second direction with respect to at least one of the first number of first electrodes to correspond to each other, and a value acquired by multiplying the number of unit cells constituting at least one first electrode connected to a first trace among the first electrodes included in the touch window area and the number of unit cells constituting at least one second electrode connected to a second trace among the second electrodes included in the touch window area is less than a predetermined value.

16 Claims, 20 Drawing Sheets

(56) References Cited

U.S. PATENT DOCUMENTS

| | | |
|---|---|---|
| 2016/0179283 A1 | 6/2016 | Hoch |
| 2016/0196001 A1* | 7/2016 | Ku ..................... G06F 3/04186 345/174 |
| 2016/0266710 A1* | 9/2016 | Bytheway ............. G06F 3/0446 |
| 2016/0328053 A1 | 11/2016 | Veerasamy et al. |
| 2017/0060304 A1 | 3/2017 | Hou et al. |
| 2017/0228068 A1 | 8/2017 | Pu et al. |
| 2022/0083174 A1* | 3/2022 | Kim ..................... G06F 3/0445 |

* cited by examiner

[FIG. 1a]
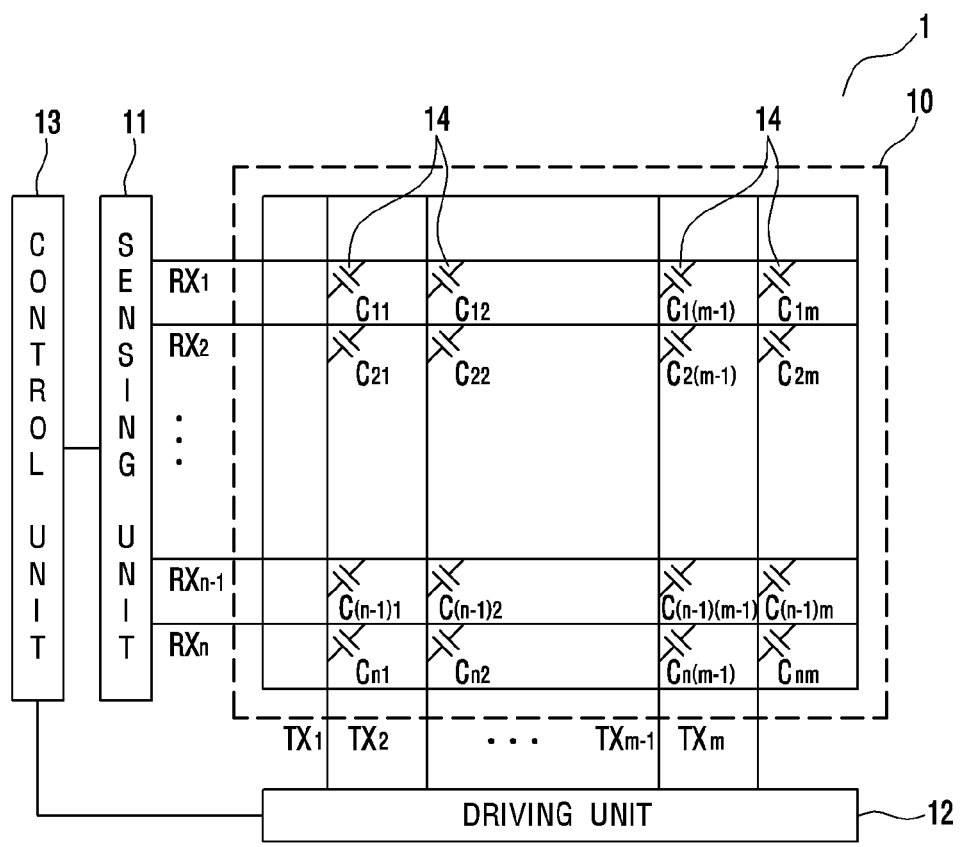

[FIG. 1b]
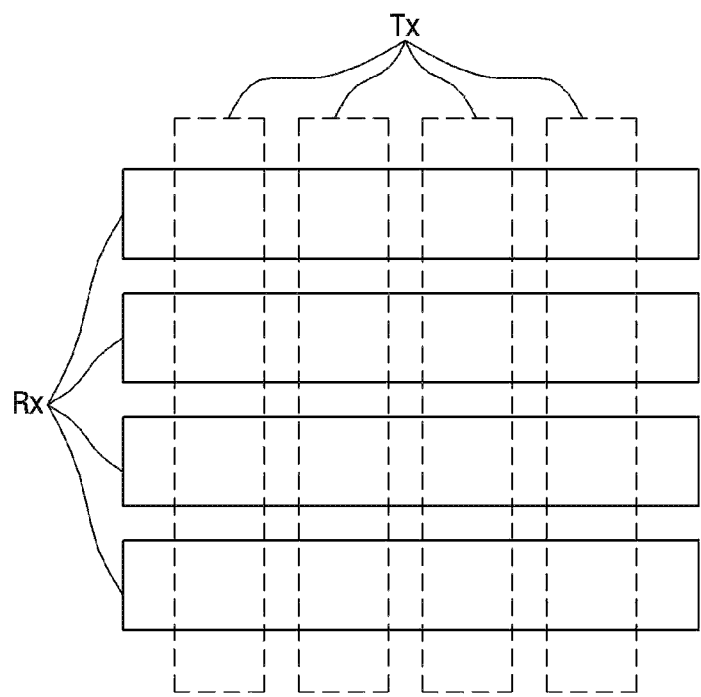

[FIG. 1c]
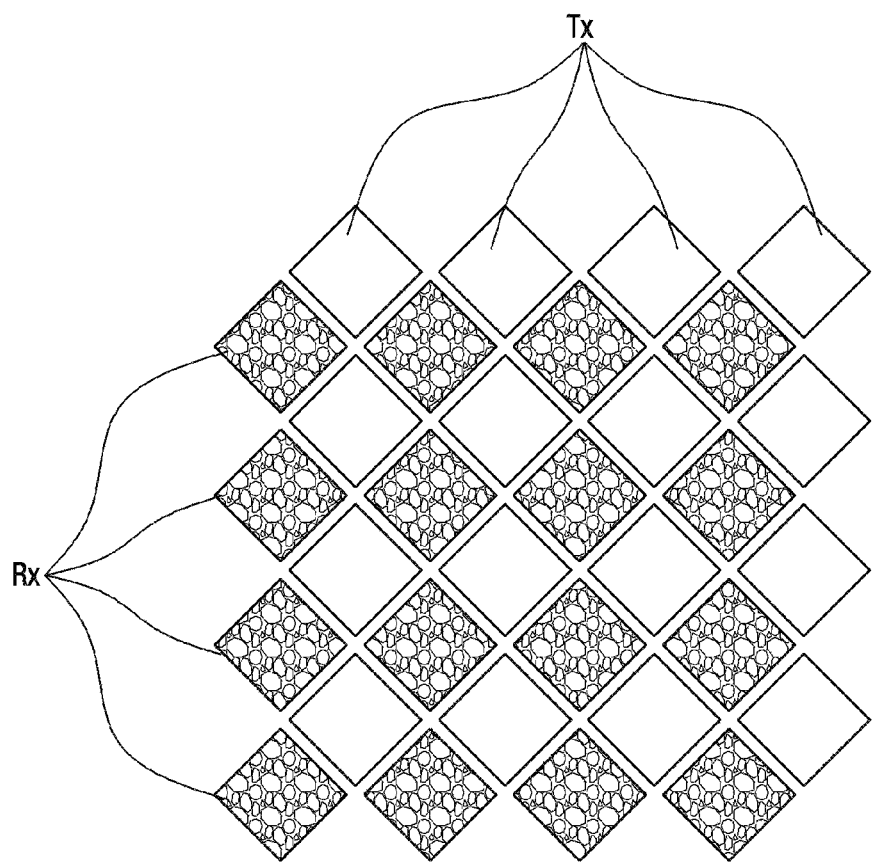

[FIG. 1d]
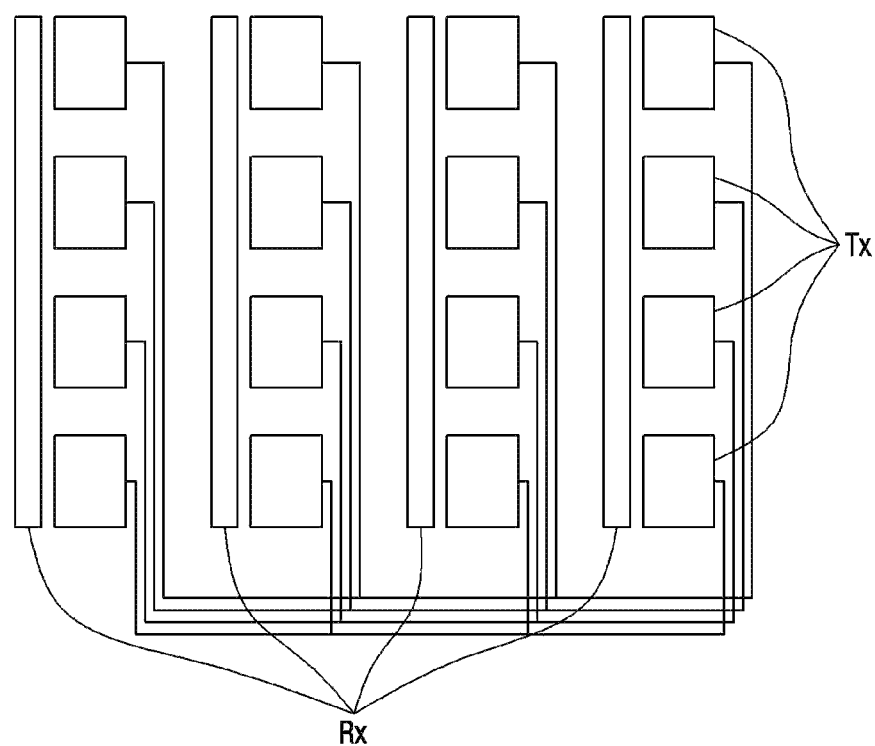

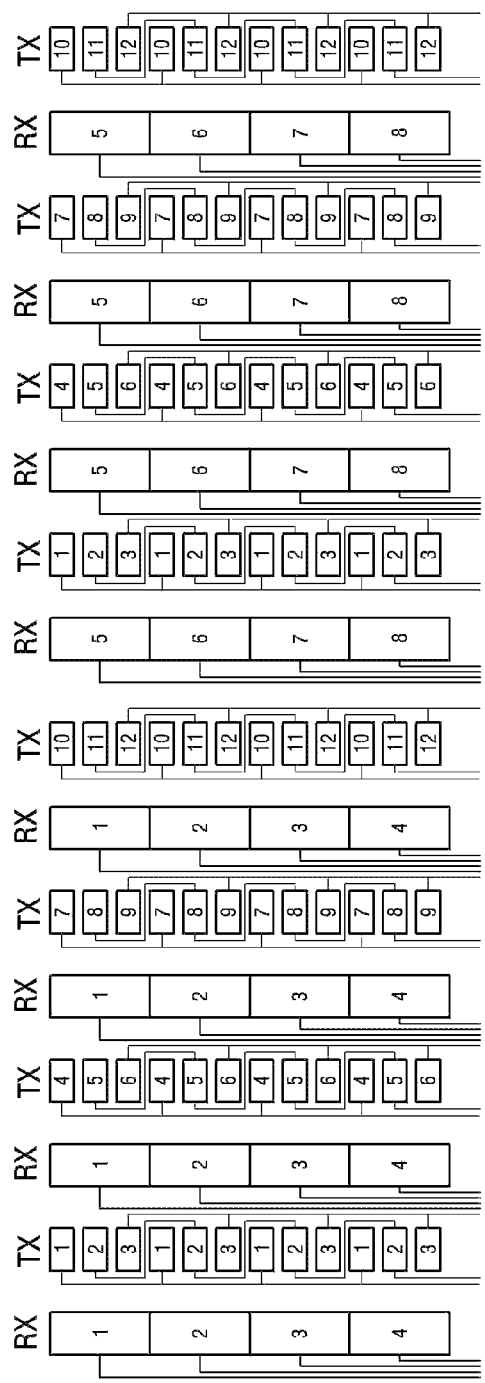
[FIG. 2]

[FIG. 3a]
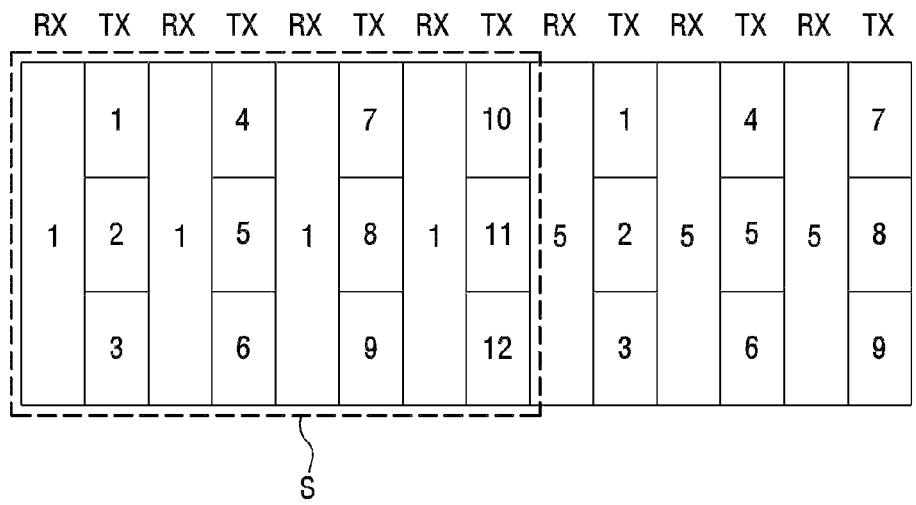
[FIG. 3b]
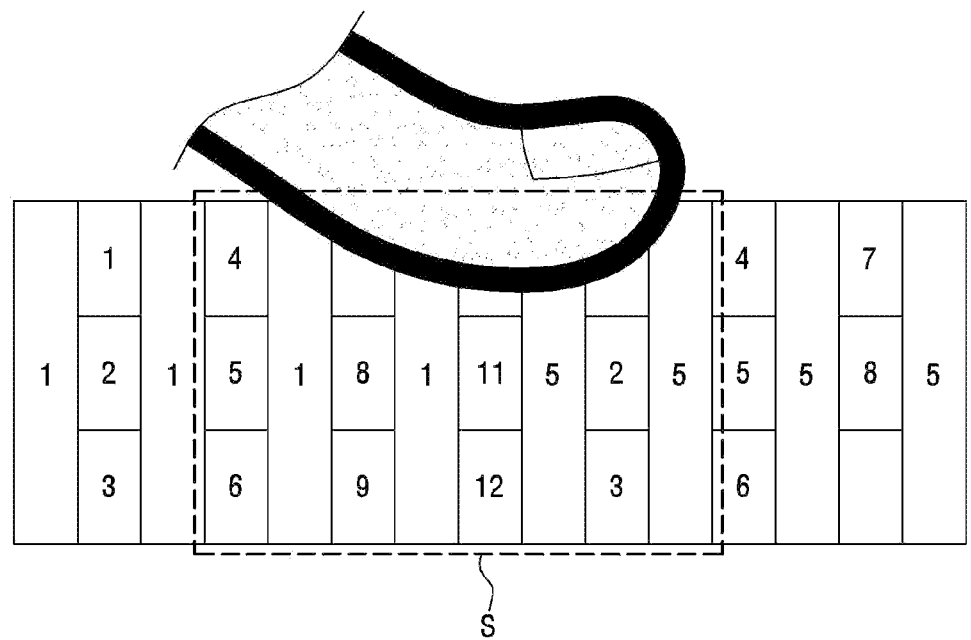

[FIG. 3c]
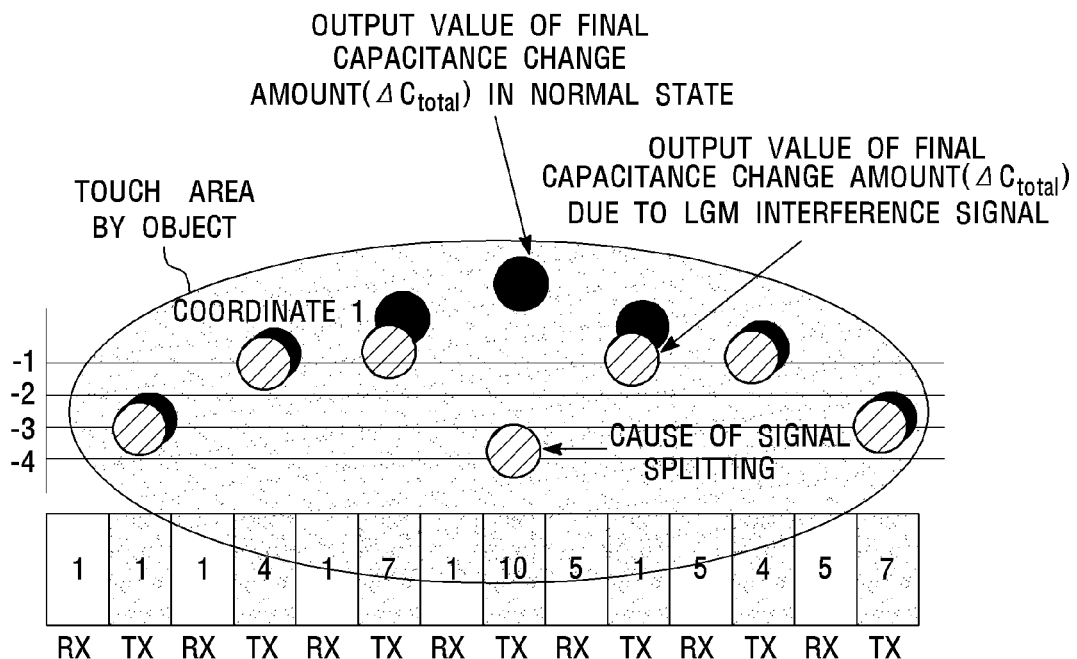

[FIG. 3d]
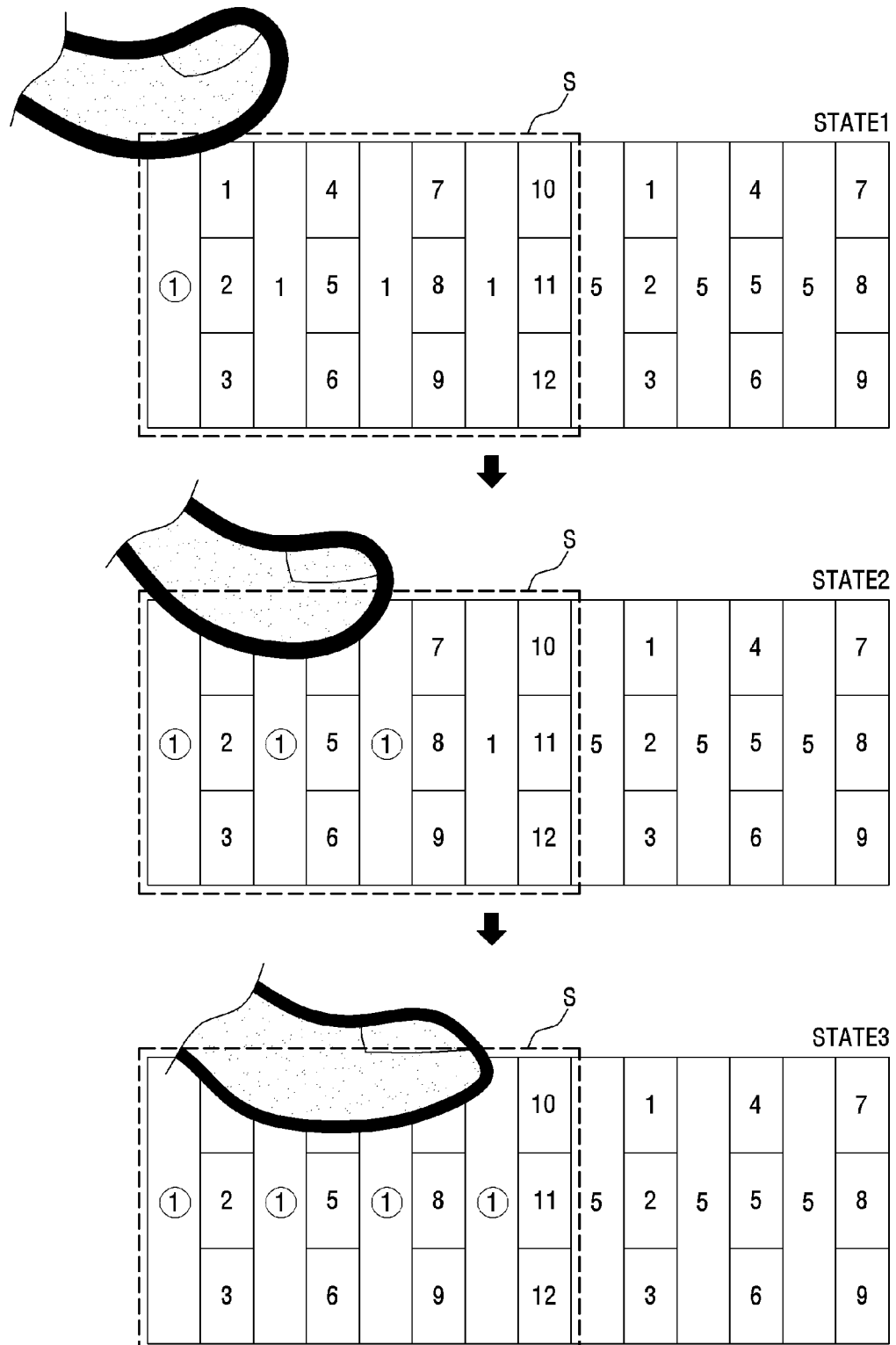

[FIG. 3e]
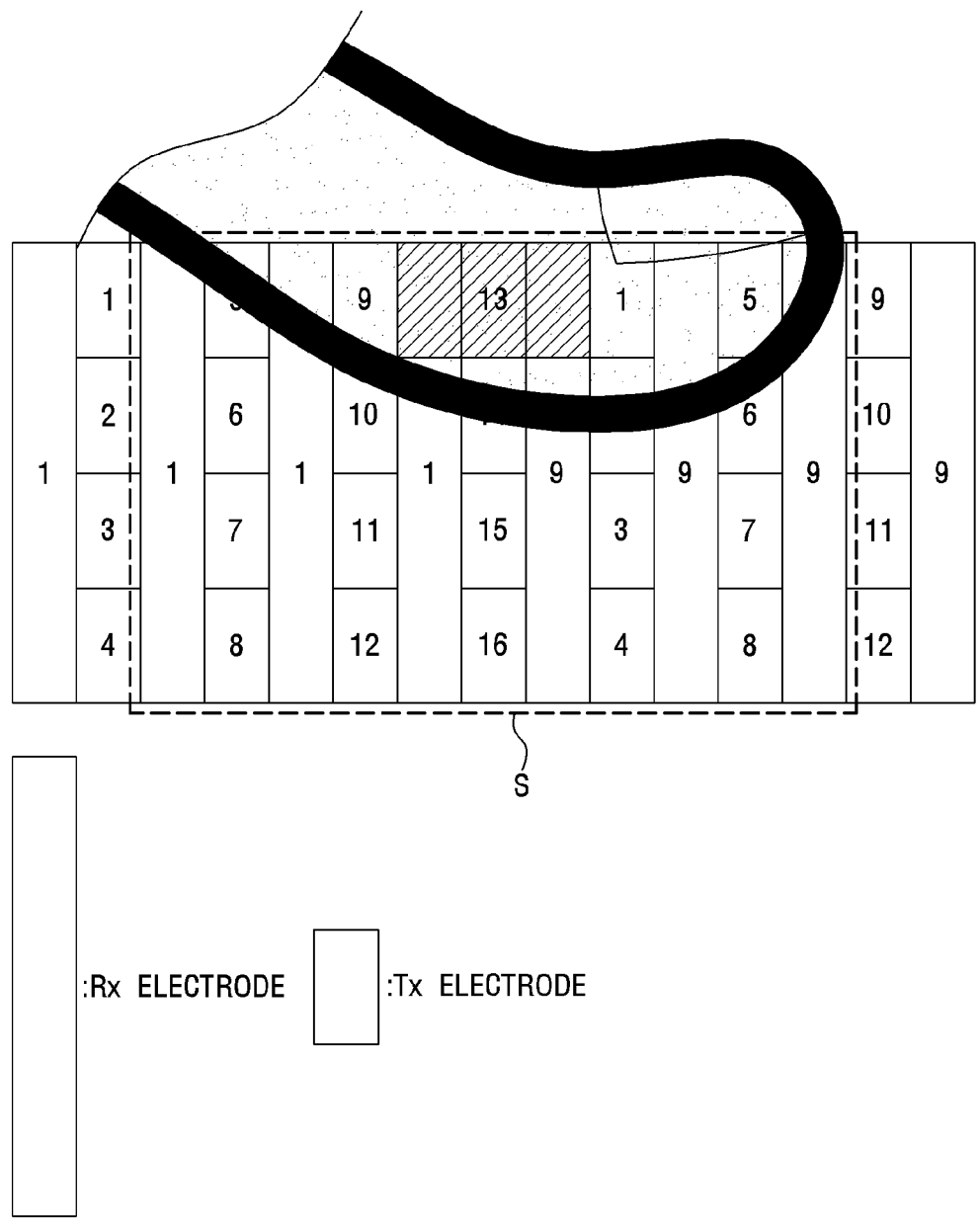

[FIG. 4a]
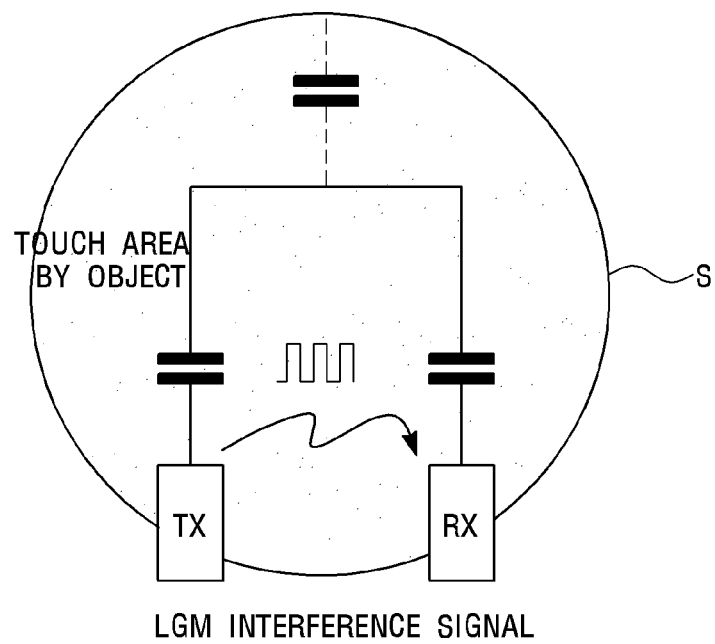

[FIG. 4b]
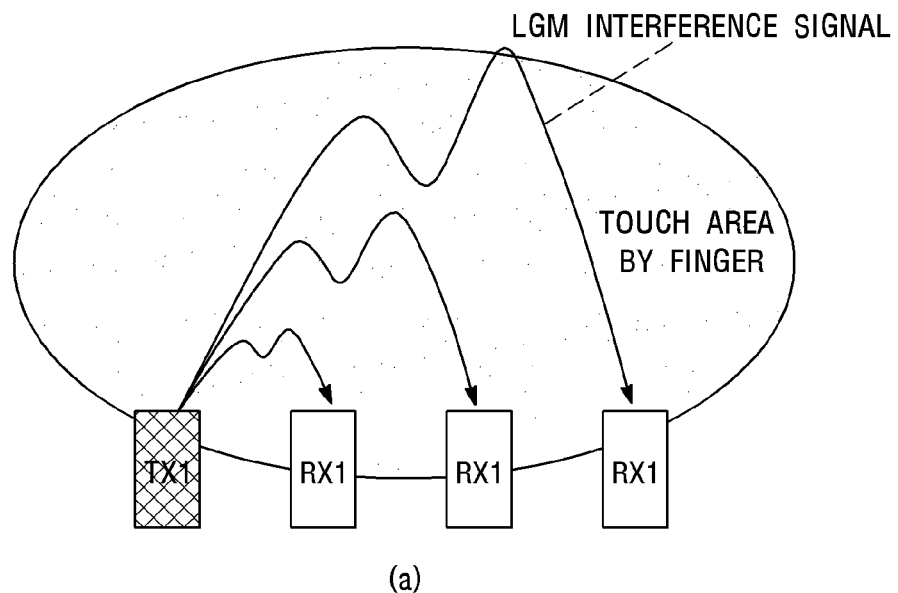
(a)
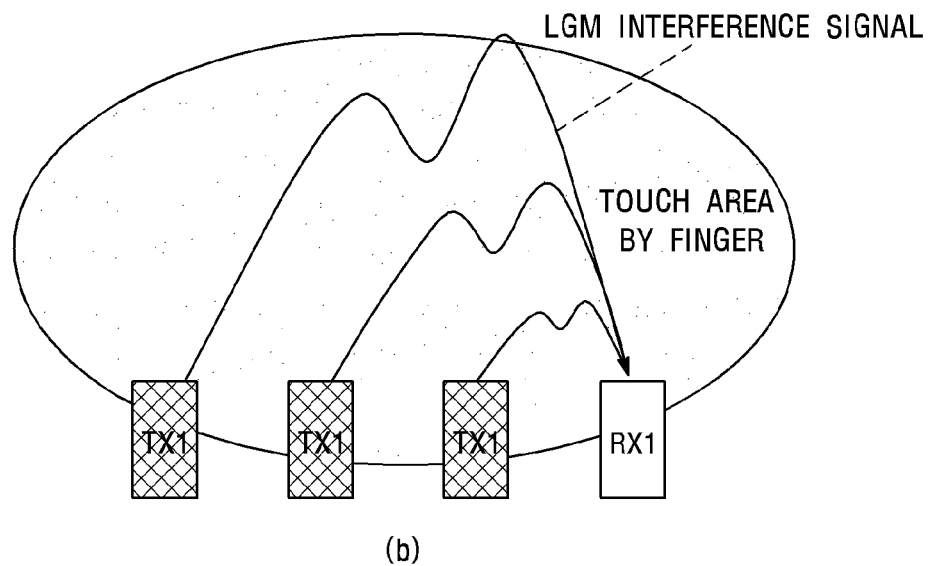
(b)

[FIG. 4c]
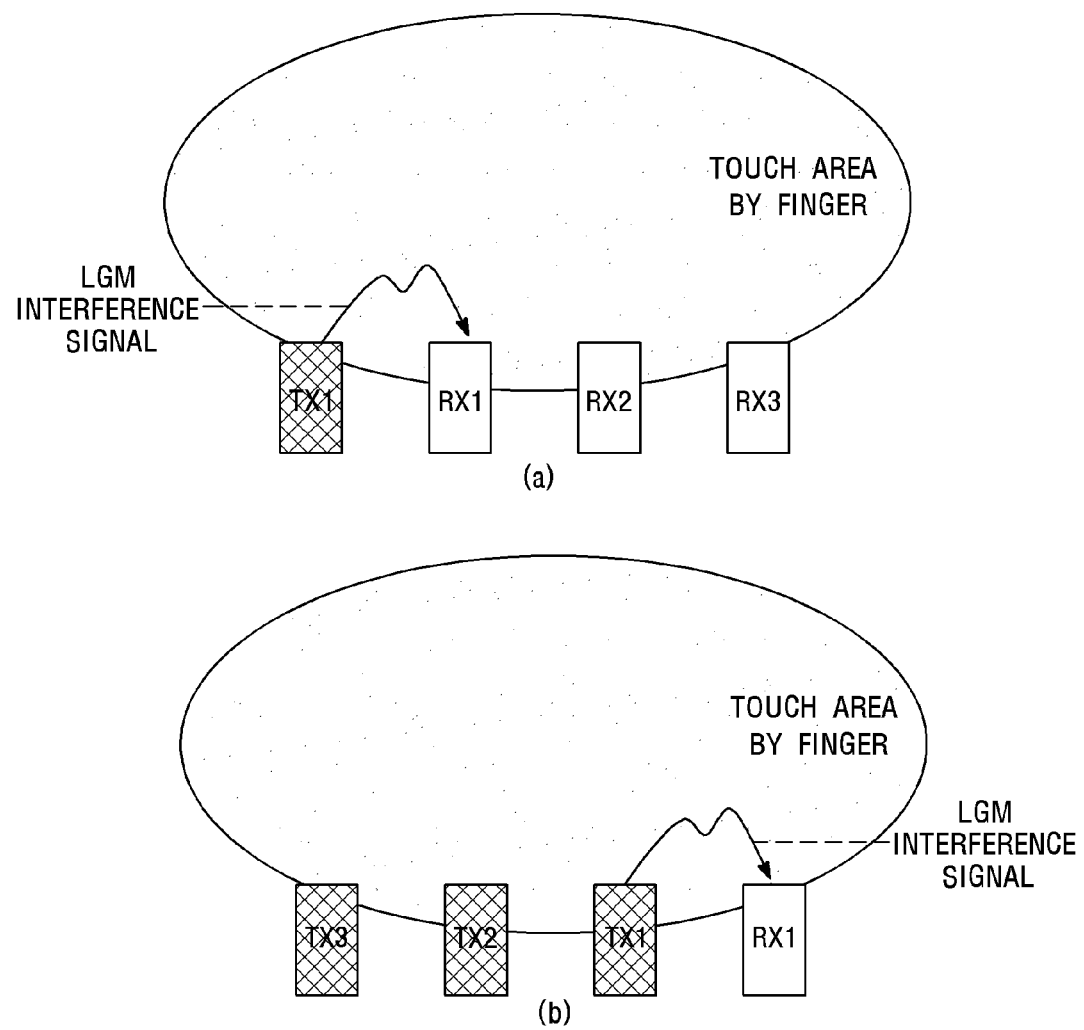

[FIG. 4d]
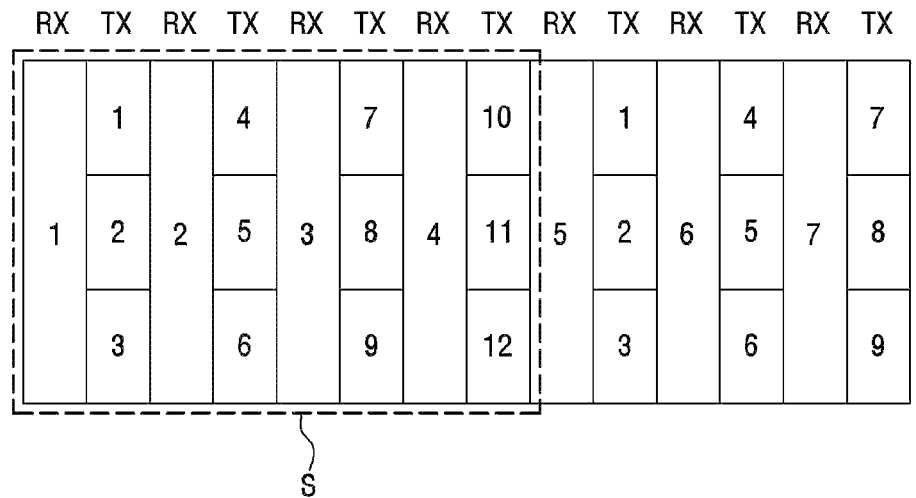
[FIG. 4e]
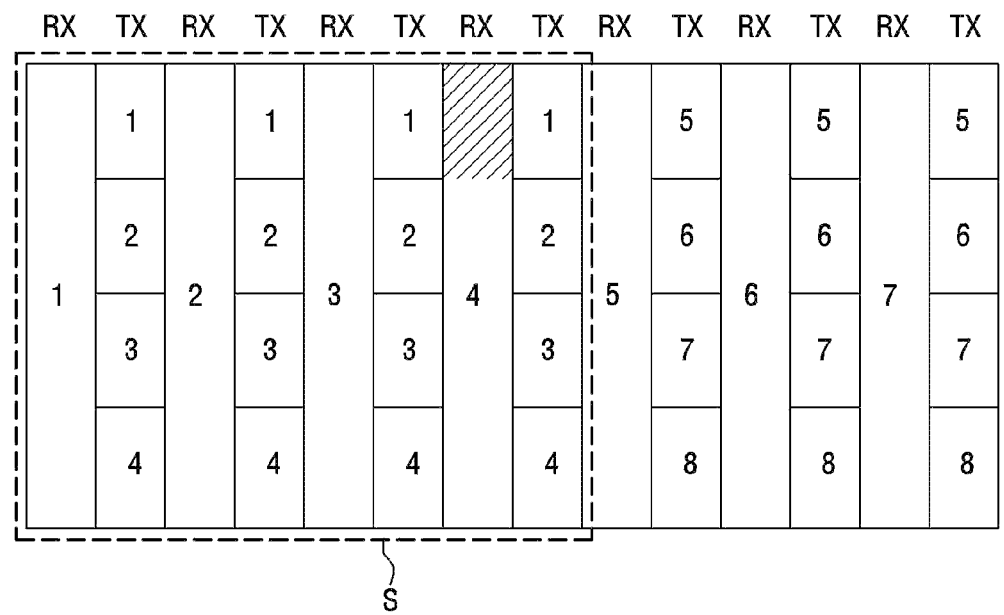

[FIG. 5a]
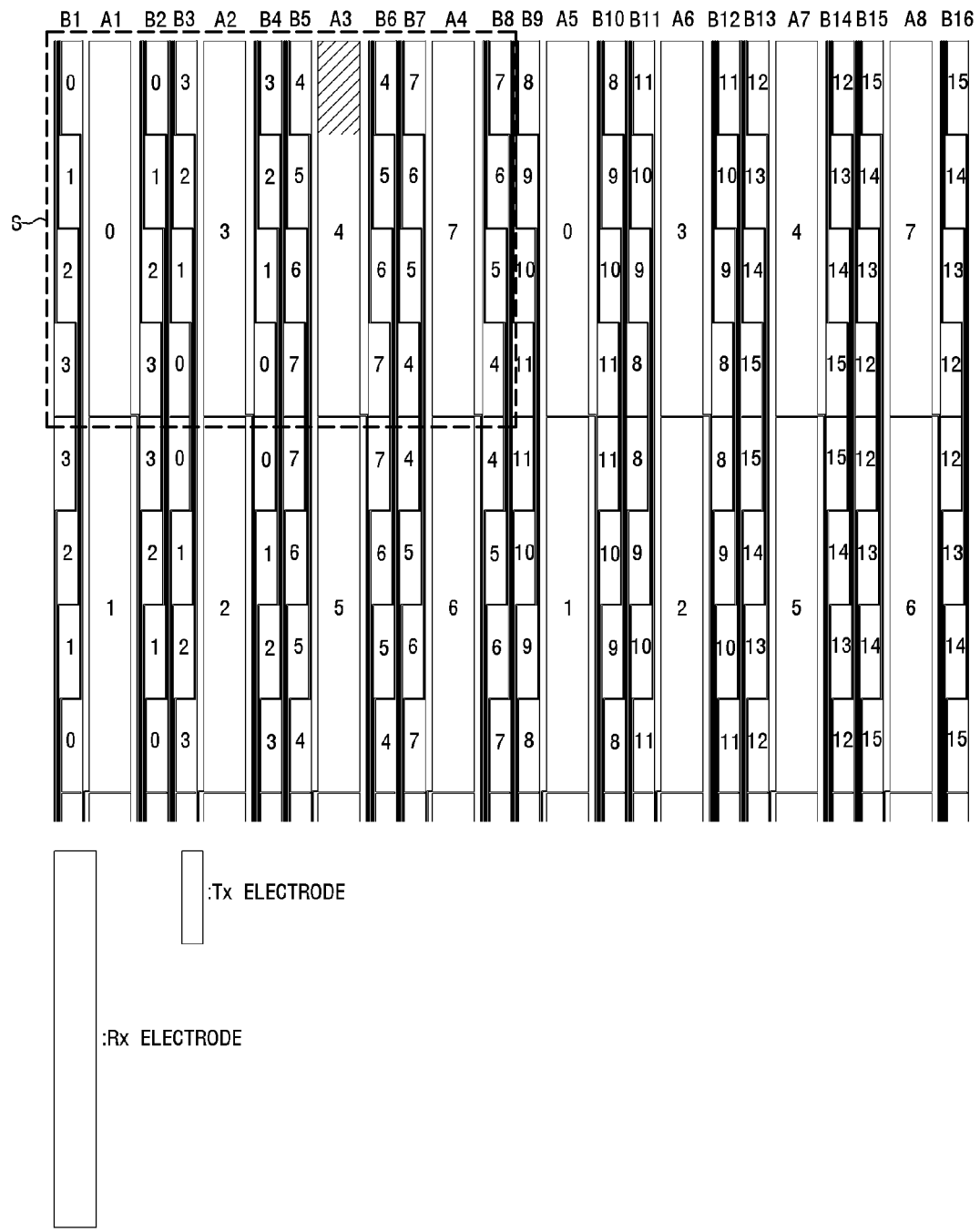

[FIG. 5b]
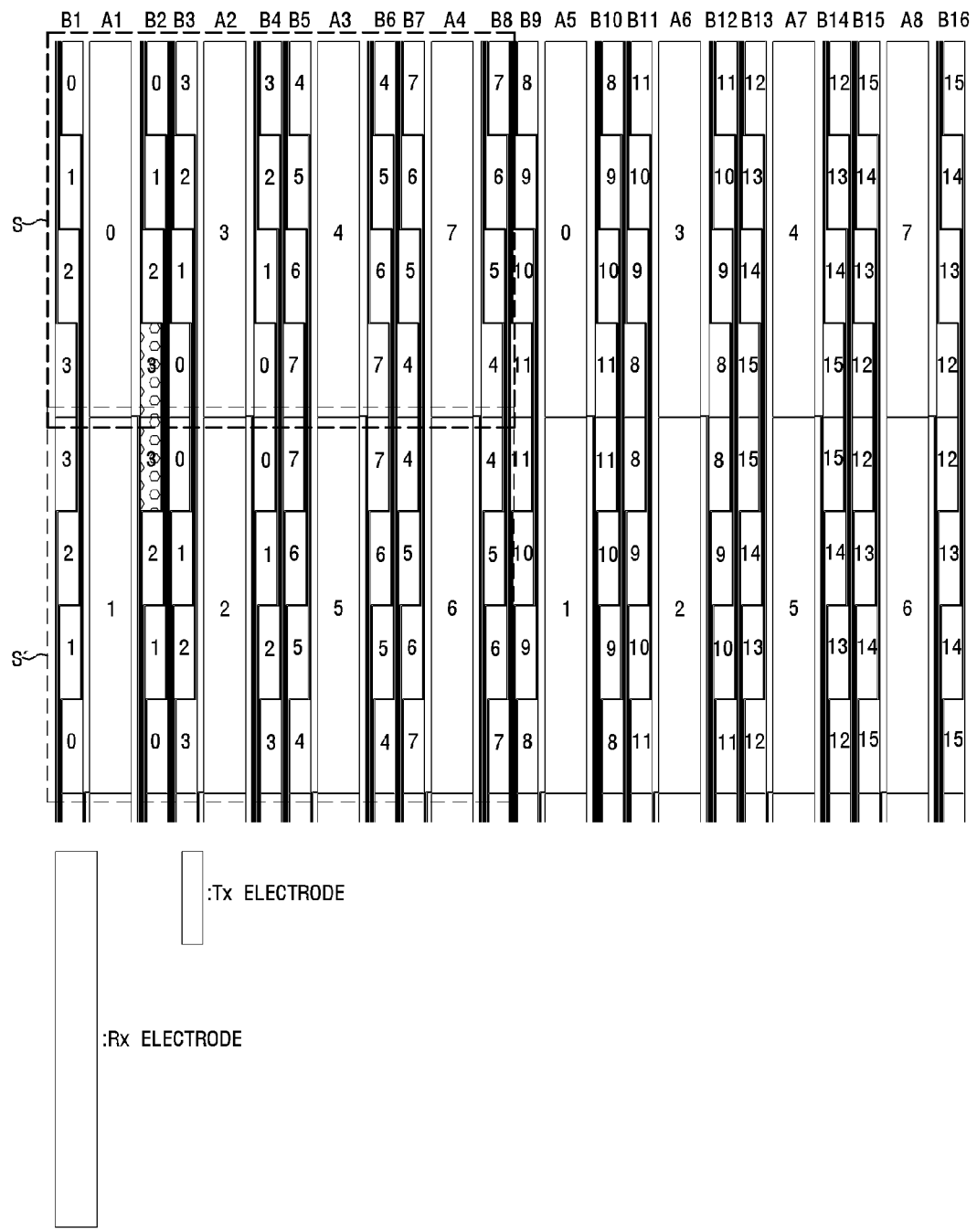

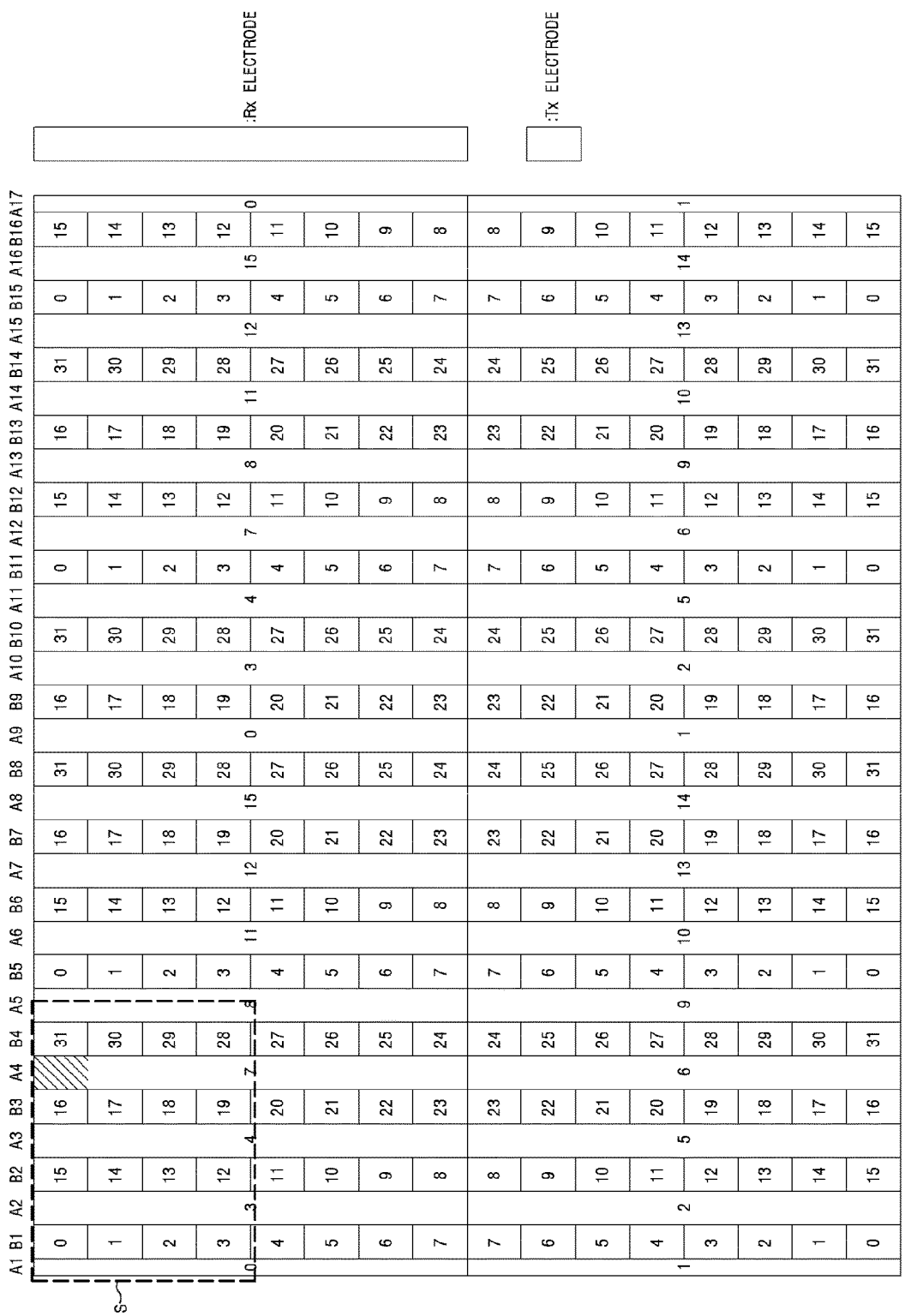
[FIG. 6a]

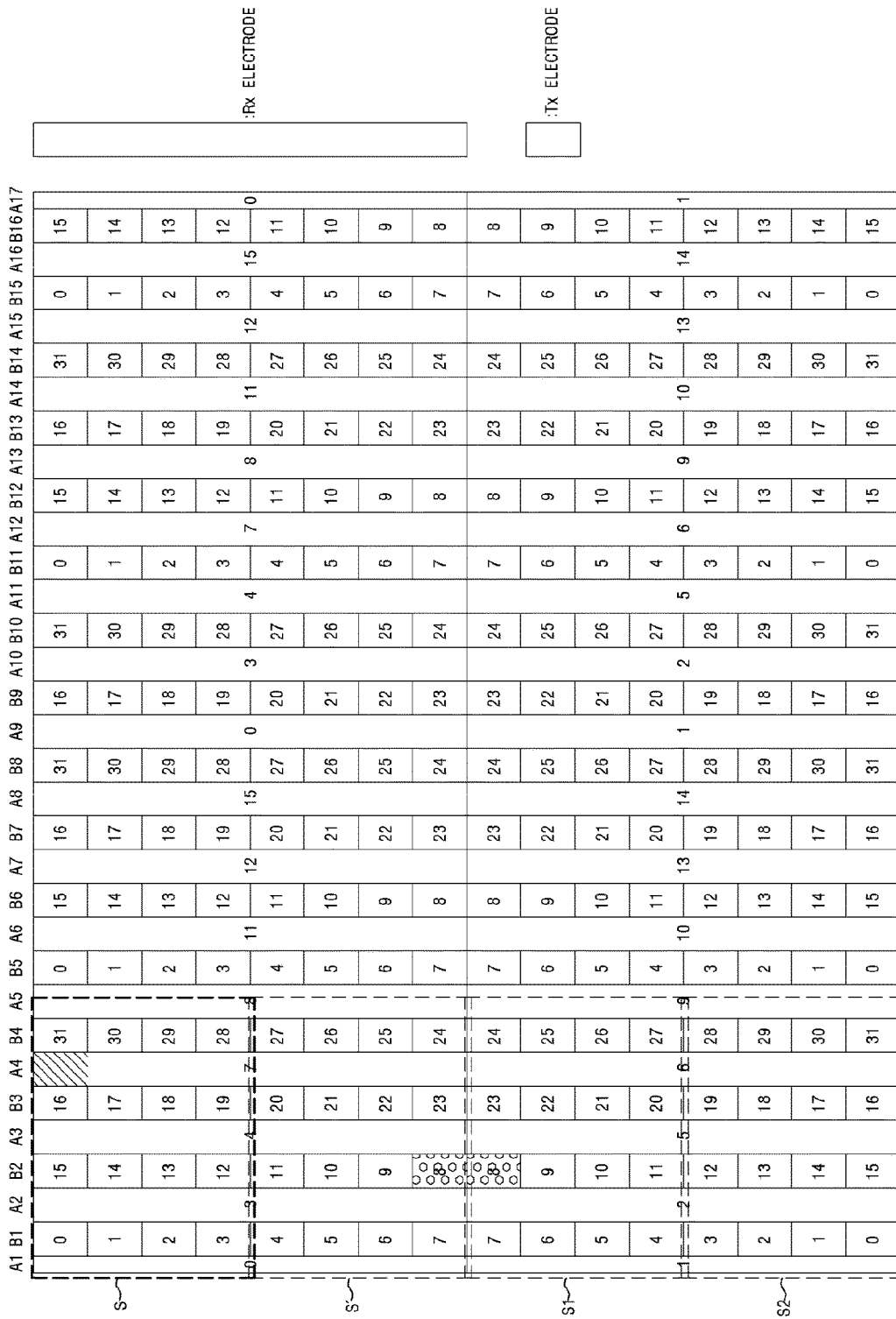
[FIG. 6b]

[FIG. 7]
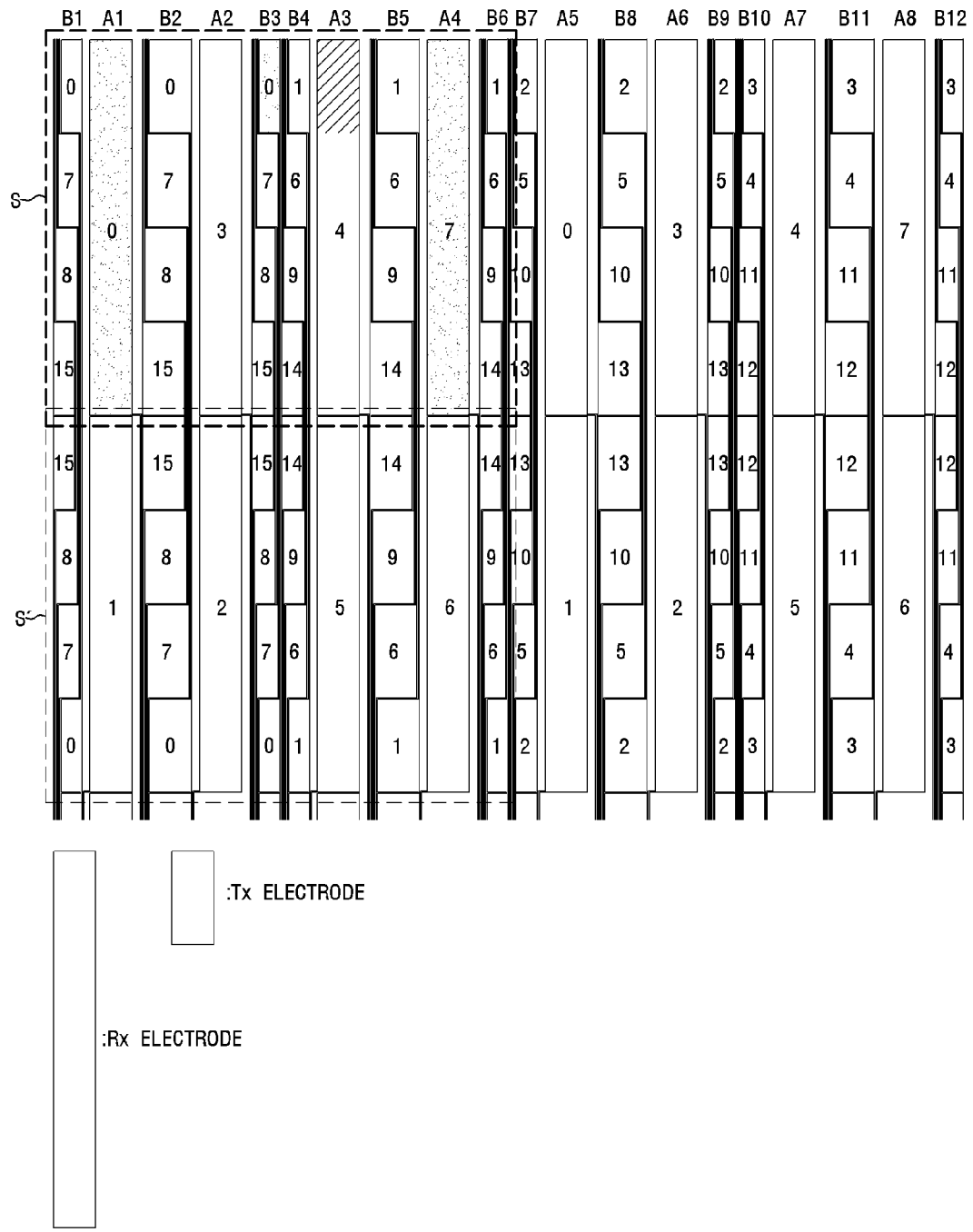

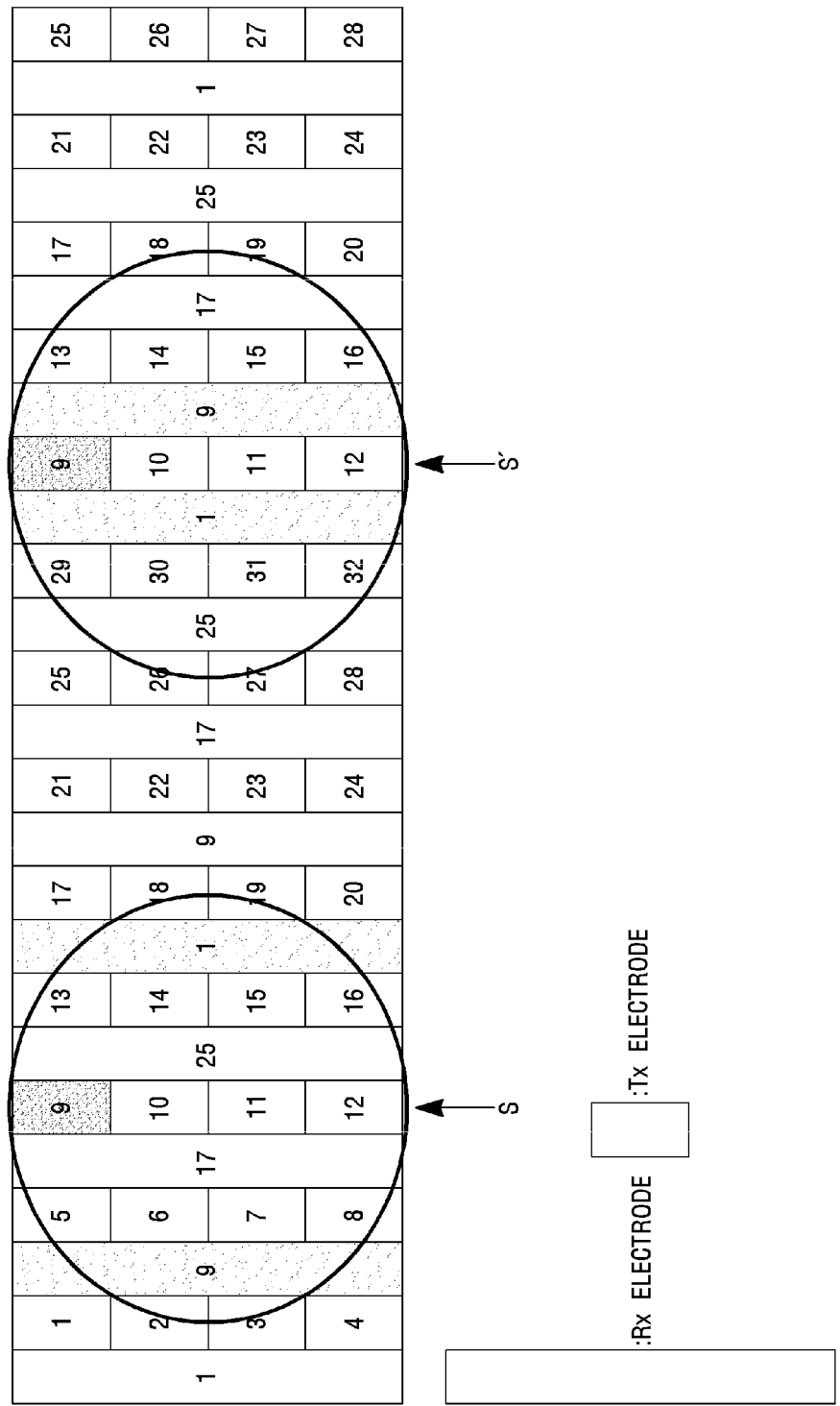
[FIG. 8a]

[FIG. 8b]

| | Rx00 | Rx01 | Rx02↓S | Rx03 | Rx04 | Rx05 | Rx06 | Rx07↓S' | Rx08 | Rx09 | Rx10 | Rx11 |
|---|---|---|---|---|---|---|---|---|---|---|---|---|
| Tx00 | 25 | 2 | 22 | 16 | -2 | -2 | -18 | -28 | -21 | -25 | -32 | -10 |
| Tx01 | 24 | 85 | 79 | 29 | 0 | -4 | -37 | -81 | -72 | -13 | -12 | 0 |
| Tx02 | 118 | 181 | 146 | 133 | 2 | -10 | -120 | -124 | -126 | -94 | 9 | 3 |
| Tx03 | 157 | 171 | 151 | 167 | 46 | -8 | -135 | -126 | -132 | -122 | -26 | -1 |
| Tx04 | 139 | 116 | 122 | 122 | 69 | -8 | -130 | -128 | -160 | -131 | -18 | -6 |
| Tx05 | 137 | 115 | 118 | 110 | -27 | -9 | -114 | -132 | -148 | -117 | -12 | -7 |
| Tx06 | 34 | 84 | 86 | 48 | 16 | -2 | -32 | -97 | -60 | -27 | 0 | -6 |
| Tx07 | 18 | 23 | 29 | 18 | 43 | -6 | -19 | -38 | -29 | -16 | -2 | -6 |
| Tx08 | 3 | 4 | 5 | 1 | 1 | -1 | 0 | -3 | -3 | -6 | 0 | 0 |
| Tx09 | 0 | -3 | -1 | 6 | -1 | -1 | -6 | -8 | -1 | 2 | 7 | 2 |
| Tx10 | 2 | -2 | -5 | -2 | -4 | 1 | -8 | -5 | -5 | -8 | -1 | 3 |

TOUCH SENSOR PANEL AND TOUCH INPUT DEVICE WITH REDUCED MAGNITUDE OF LOW GROUND MASS INTERFERENCE SIGNAL

CROSS-REFERENCE TO RELATED PATENT APPLICATIONS

The present application is a U.S. national stage application under 35 U.S.C. § 371 of PCT Application No. PCT/KR2019/009545, filed Jul. 31, 2019, which claims priority to Korean Patent. Application No. 10-2019-0028926, filed Mar. 13, 2019, which claims priority to Korean Patent Application No. 10-2018-0090991, filed Aug. 3, 2018. The disclosures of the aforementioned priority applications are incorporated herein by reference in their entireties.

TECHNICAL FIELD

The present invention relates to a touch sensor panel and a touch input device, and more particularly, to a touch sensor panel and a touch input device, which improve touch sensing performance in a state of not holding a device by hand.

BACKGROUND ART

Various kinds of input devices are being used to operate a computing system. For example, input devices such as includes a button, a key, a joystick and a touch screen are used. Since the touch screen is easy and simple to operate, the touch screen is increasingly being used to operate: the computing system.

The touch screen may constitute a touch surface of a touch input device including a touch sensor panel which may be a transparent panel including a touch-sensitive surface. The touch sensor panel is attached to a front side of a display screen, and then the touch-sensitive surface may cover a visible side of the display screen. The touch screen allows a user to operate the computing system by simply touching the touch screen by a finger, etc. Generally, the computing system recognizes the touch and a position of the touch on the touch screen and analyzes the touch, and thus, performs operations in accordance with the analysis.

The touch sensor panel applies a driving signal to the driving electrode and determines whether a touch is made from a signal input through a receiving electrode. The driving electrode and the receiving electrode may be formed on different layers or on the same layer. An example in which the driving electrode and the receiving electrode are formed on the same layer is US Patent Application Publication No. US2013/0181942. If the driving electrode and the receiving electrode are formed on different layers, cost increases, so it is preferable to form the driving electrode and the receiving electrode on the same layer. However, even if the driving electrode and the receiving electrode are implemented on the same layer, there is a need to reduce the number of wires, or by variously changing the electrode arrangement of the touch sensor panel with the reduced number of wires, it is necessary to reduce noise or suppress unnecessary signal generation.

In addition, in the case of implementing the driving electrode and the receiving electrode on the same layer, a signal detected by a low ground mass (LGM) disappears when a device on which a touch sensor panel such as a smartphone is mounted is touched without holding the device with the hand or there may be a phenomenon in which the signal appears as being touched at two or more points.

DISCLOSURE

Technical Problem

The present invention is contrived from the above-described necessity, and has been made in an effort to provide a touch sensor panel capable of improving a phenomenon in which a signal detected by a low around mass (LGM) disappears or a signal indicating that the touch occurs at two or more points appears in a touch sensor panel in which a driving electrode and a receiving electrode are arranged on the same layer.

Technical Solution

A touch sensor panel according to an embodiment of the present invention includes: a plurality of first electrodes and a plurality of second electrodes, in which a touch window area includes a first number of consecutive first electrodes in a first direction among the plurality of first electrodes and a second number of consecutive second electrodes in a second direction with respect to at least one of the first number of first electrodes to correspond to each other, and a value acquired by multiplying the number of unit cells constituting at least one first electrode connected to a first trace among the first electrodes included in the touch window area and the number of unit cells constituting at least one second electrode connected to a second trace among the second electrodes included in the touch window area is less than a predetermined value.

Further, the touch sensor panel may further include a plurality of first electrode arrays including the plurality of first electrodes and a plurality of second electrode arrays including the plurality of second electrodes, in which at least two of the second electrodes included in the second electrode array which is any one of the plurality of second electrode arrays may be arranged to correspond to each other in any one of the first electrodes included in the first electrode array which is any one of the plurality of first electrode arrays, any one of the first electrodes included in the first electrode array may be connected to some of the remaining first electrodes other than the any one first electrode among the plurality of first electrodes by using the first trace, and any one of the second electrodes included in the second electrode array may be connected to some of the remaining second electrodes other than the any one second electrode among the plurality of second electrodes by using the second trace.

The first electrodes included in the touch window area among the plurality of first electrodes may be connected to different first traces, respectively.

The second electrode array may be arranged on one side of any one of the first electrodes included in the first electrode array and the other second electrode array may be arranged on the other side, any one of the second electrodes included in the second electrode array and any one of other second electrodes included in the other second electrode array may be arranged in the same row around any one of the first electrodes, and any one of the second electrodes included in the second electrode array arranged in the same row and any one of the other second electrodes included in the other second electrode array may be connected by using the second trace.

The touch sensor panel may further include an adjacent touch area implemented to have the same size as the touch window area adjacent to the touch window area in a column direction, in which each of the second electrodes included in the touch window area among the second electrodes included in the second electrode array may be repeatedly arranged in the adjacent touch area among the second electrodes included in the second electrode array.

One of the second electrodes included in the touch window area among the second electrodes included in the second electrode array and one of the second electrodes included in the adjacent touch area among the second electrodes included in the second electrode array may be arranged adjacent to each other and the second electrodes arranged adjacent to each other may be connected by using the second trace.

For example, the predetermined value may be 16.

A pair of a predetermined first electrode among the first electrodes included in the touch window area and a predetermined second electrode among the second electrodes may not exist in other window areas other than the touch window area.

The touch sensor panel may further include a control unit detecting whether to touch a touch sensor including the plurality of first electrodes and the plurality of second electrodes, in which the control unit may use a predetermined noise signal value detected in a predetermined second electrode among the second electrodes included in the touch window area and some of the first electrodes spaced apart from the predetermined second electrode to detect only a mutual capacitance signal value acquired by excluding the display noise signal value from signal values detected in the remaining electrodes among the first electrodes adjacent to the predetermined second electrode.

The predetermined noise signal value may include at least one of a display noise signal value, a noise signal value generated according to image conversion on a display, and an LGM interference signal value.

Advantageous Effects

According to an embodiment of the present invention, a phenomenon can be improved in which a signal detected by a low ground mass (LGM) disappears or a signal indicating that a touch occurs at two or more points appears in a touch sensor panel in which a driving electrode and a receiving electrode are arranged on the same layer. As a result, touch sensing performance can be improved.

Further, it is possible to enhance touch sensitivity without generating a negative final capacitance change amount.

In addition, by reducing the number of traces, the touch sensor panel can be manufactured to be slimmer, while manufacturing cost can be reduced.

DESCRIPTION OF DRAWINGS

FIG. 1a is a configuration diagram of a touch sensor panel, and FIGS. 1b to 1d are diagrams illustrating an arrangement form of touch sensors implemented on different layers or touch sensors implemented on the same layer.

FIG. 2 is a diagram illustrating a touch sensor panel in which the number of traces is relatively reduced.

FIGS. 3a to 3e and FIGS. 4a to 4g are diagrams referred for describing a technical reason for generation of an LGM interference signal.

FIG. 5a and FIG. 5b are diagrams referred for describing an arrangement form of electrodes in a touch sensor panel according to an embodiment of the present invention.

FIG. 6a and FIG. 6b illustrate an electrode arrangement form of a touch sensor panel 1 according to another embodiment of the present invention.

FIG. 7 is a diagram that illustrates a touch sensor panel 1 according to another embodiment of the present invention.

FIGS. 8a and 8b is a diagram referred to for describing a final capacitance change amount of '-' which occurs on a touch sensor panel in which a driving electrode and a receiving electrode are arranged on the same layer.

MODE FOR INVENTION

The following detailed description of the present invention will be made with reference to the accompanying drawings which illustrate a specific embodiment in which the present invention may be implemented as an example. The embodiment will be described in detail so that those skilled in the art is enough to be able to embody the present invention. It should be understood that various embodiments of the present invention are different from each other and need not be mutually exclusive. For example, specific shapes, structures, and characteristics described herein may be implemented in other embodiments without departing from the spirit and scope of the present invention in relation to one embodiment. In addition, it is to be understood that the location or arrangement of individual components within each disclosed embodiment may be changed without departing from the spirit and scope of the present invention. Accordingly, the detailed description to be described below is not intended to be taken in a limiting sense, and the scope of the present invention, if properly described, is limited only by the appended claims, along with all scopes equivalent to those claimed by the claims. Similar reference numerals in the drawings designate the same or similar functions in many aspects.

Hereinafter, a touch input device 1000 according to an embodiment of the present invention will be described with reference to the accompanying drawings.

Hereinafter, a touch input device 1000 according to an embodiment of the present invention will be described with reference to the accompanying drawings. Hereinafter, a capacitive touch sensor panel 1 is exemplified below, but the present invention may be applied even to the touch sensor panel 1 capable of detecting a touch position in any method in the same/similar manner.

FIG. 1a is a schematic diagram of a capacitive touch sensor 10 included in a touch sensor panel 1 of a general touch input device 1000 and a configuration for operation thereof. Referring to FIG. 1a, the touch sensor 10 may include a plurality of driving electrodes TX1 to TXn and a plurality of receiving electrodes RX1 to RXm, and may include a driving unit 12 which applies a driving signal to the plurality of driving electrodes TX1 to TXn for the purpose of the operation of the touch sensor 10, and a sensing unit 11 which detects a touch and/or a touch position by receiving a sensing signal including information on a capacitance change amount changing according to the touch on a touch surface from the plurality of receiving electrodes RX1 to RXm.

As illustrated in FIG. 1a, the touch sensor 10 may include the plurality of driving electrodes TX1 to TXn and the plurality of receiving electrodes RX1 to RXm. While FIG. 1a illustrates that the plurality of driving electrodes TX1 to TXn and the plurality of receiving electrodes RX1 to RXm of the touch sensor 10 form an orthogonal array, the present invention is not limited thereto and the plurality of driving electrodes TX1 to TXn and the plurality of receiving electrodes RX1 to RXm may have arbitrary numbers of dimensions including a diagonal array, a concentric array, a 3-dimensional random array, etc., and an application array thereof. Here, "n" and "m" which are positive integers may be the same as each other or may have different values from each other and magnitudes of the values may be changed depending on the embodiment.

The plurality of driving electrodes TX1 to TXn and the plurality of receiving electrodes RX1 to RXm may be arranged to cross each other. The driving electrode TX may include the plurality of driving electrodes TX1 to TXn extending in a first axial direction and the receiving electrode RX may include the plurality of receiving electrodes RX1 to RXm extending in a second axial direction crossing the first axial direction.

As illustrated in FIG. 1b, the plurality of driving electrodes TX1 to TXn and the plurality of receiving electrodes RX1 RXm may be formed on different layers. For example, one of the plurality of driving electrodes TX1 to TXn and the plurality of receiving electrodes RX1 to RXm may be formed on an upper surface of a display panel (not illustrated), and the other one may be formed on a lower surface of a cover to be described later or in the display panel (not illustrated).

Further, as illustrated in FIGS. 1c and 1d, in the touch sensor 10 according to the embodiment of the present invention, the plurality of driving electrodes TX1 to TXn and the plurality of receiving electrodes RX1 to RXm may be formed in the same layer. For example, the plurality of driving electrodes TX1 to TXn and the plurality of receiving electrodes RX1 to RXm may be formed on the top of the display panel.

The plurality of driving electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example and the driving electrode TX and the receiving electrode RX may also be made of another transparent conductive material or an opaque conductive material. For instance, the driving electrode TX and the receiving electrode RX may be formed to include at least any one of silver ink, copper, nano silver or carbon nanotube (CNT). Further, the driving electrode TX and the receiving electrode RX may be implemented by a metal mesh.

The driving unit 12 according to an embodiment of the present invention may apply a driving signal to the driving electrodes TX1 to TXn. In an embodiment of the present invention, one driving signal may be sequentially applied to one driving electrode at a time to the first driving electrode TX1 to the n-th driving electrode TXn. The driving signal may be applied again repeatedly. This is only an example and the driving signals May be applied to the plurality of driving electrodes at the same time in accordance with the embodiment.

Through the receiving electrodes RX1 to RXm, the sensing unit 11 receives the sensing signal including information on a capacitance (Cm) 14 generated between the receiving electrodes RX1 to RXm and the driving electrodes TX1 to TXn to which the driving signal has been applied, thereby detecting whether the touch has occurred and where the touch has occurred. For example, the sensing signal may be a signal obtained by coupling the driving signal applied to the driving electrode TX by the capacitance (CM) 14 generated between the driving electrode TX and the receiving electrode RX. As such, the process of sensing the driving signal applied from the first driving electrode TX1 to the n-th driving electrode TXn through the receiving electrodes RX1 to RXm may be referred to as a process of scanning the touch sensor 10.

For example, the sensing unit 11 may include a receiver (not illustrated) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. In this case, the positive (+) input terminal of the amplifier may be connected to the ground. Further, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 14, and then converts the integrated current signal into voltage. The sensing unit 11 may further include an analog-to-digital converter (ADC) (not shown) which converts the integrated data by the receiver into digital data. Later, the digital data may be input to a processor (not illustrated) and processed to obtain information on the touch on the touch sensor 10. The sensing unit 11 may include the ADC and the processor as well as the receiver.

The control unit 13 may perform a function of controlling the operations of the driving unit 12 and the sensing unit 11. For example, the control unit 13 generates and transmits a driving control signal to the driving unit 12, so that the driving signal may be applied to a predetermined driving electrode TV at a predetermined time. Further, the control unit 13 generates and transmits the sensing control signal to the sensing unit 11, so that the sensing unit 11 may receive the sensing signal from the predetermined receiving electrode RX at a predetermined time and perform a predetermined function.

In FIG. 1a, the driving unit 12 and the sensing unit 11 may constitute a touch detection device (not illustrated) capable of detecting whether the touch has occurred on the touch sensor 10 and/or There the touch has occurred. The touch detection device may further include the control unit 13. The touch detection device may be implemented by being integrated on a touch sensing integrated circuit (IC). The driving electrode TX and the receiving electrode RX included in the touch sensor 10 may be connected to the driving unit 12 and the sensing unit 11 included in the touch sensing IC through, for example, a conductive trace and/or a conductive pattern printed on a circuit board, or the like. The touch sensing IC may be located on a circuit board on which the conductive pattern is printed, e.g., a touch circuit board (hereinafter, referred to as a touch PCB). According to an embodiment, the touch sensing IC may be mounted on a main board for operation of the touch input device 1000.

As described above, a capacitance (Cm) with a predetermined value is generated at each crossing point of the driving electrode TX and the receiving electrode RX and when an object like a finger approaches the touch sensor 10, the value of the capacitance may be changed. In FIG. 1*a*, the capacitance may represent a mutual capacitance (Cm). The sensing unit 11 senses such electrical characteristics to sense whether the touch on the touch sensor 10 is made and/or a touch position. For example, the sensing unit 110 is able to sense whether the touch occurs on the surface of the touch sensor 10 comprised of a two-dimensional plane consisting of a first axis and a second axis and/or the position thereof.

More specifically, when the touch occurs on the touch sensor 10, the driving electrode TX to which the driving signal has been applied is detected, so that the position of the second axial direction of the touch may be detected. Likewise, when the touch occurs on the touch sensor 10, the capacitance change is detected from the reception signal received through the receiving electrode RX, so that the position of the first axial direction of the touch can be detected.

Meanwhile, when the driving electrode and the receiving electrode are arranged on the same layer in the form illustrated in FIGS. 1*c* and 1*d*, the number of traces may increase. There is a disadvantage in that when the number of traces increases, a thickness of the touch sensor panel becomes larger and the manufacturing cost of the touch input device 1000 also becomes larger. Accordingly, based on FIG. 2, a touch sensor panel of a form in which the number of traces is relatively reduced will be described and an electrode connection method will be subsequently described based on the corresponding touch sensor panel. However, in FIG. 2 and the following drawings, the touch sensor panel is illustrated based on a form in which the receiving electrode is first arranged and then the driving electrode is arranged, but the scope of the present invention is not limited thereto, and the present invention may be applied even to a case where the driving electrode is arranged first and the receiving electrode is subsequently arranged in the same/similar manner.

FIG. 2 illustrates another form of a touch sensor panel in which the driving electrode and the receiving electrode are arranged on the same layer. In FIG. 1*d*, one receiving electrode is arranged adjacent to a left side of each of four driving electrode columns each including four driving electrodes, but in FIG. 2, the same receiving electrode is arranged adjacent to the left side of each of four driving electrode columns each including three driving electrodes. Meanwhile, in the present invention, the number of driving electrodes arranged to correspond to one receiving electrode is not limited to 3 or 4 and 2 or 5 or more driving electrodes may be arranged. In the case of FIG. 2, there is a difference in the number of traces between the driving electrodes as compared with FIG. 1*d*. According to the electrode connection method by the embodiment of FIG. 2, the number of traces decreases as compared with the electrode connection method by the embodiment of FIG. 1*d*.

For example, if 12 types of driving electrodes and 8 types of receiving electrodes are connected by the method of FIG. 1*d*, 8+8*12=104 traces are required. On the other hand, when the electrode connection method of FIG. 2 is applied under the same condition, 4*8+3*8=64 traces are required.

The reason for the decrease in the number of traces in the touch sensor panel of FIG. 2 is that, while in FIG. 1*d*, all respective driving electrodes corresponding adjacent to one receiving electrode column are connected to different traces, in FIG. 2, the same driving electrodes among the respective driving electrodes corresponding adjacent to one receiving electrode column are connected to one same trace. A feature implemented so as to reduce the number of traces may be applied to all touch sensor panels of the present invention in the same/similar manner.

Hereinafter, the touch sensor panels 1 according to an embodiment of the present invention, which are constituted by electrodes implemented on the same layer as the touch sensor panel of FIG. 2 and implemented to reduce the number of traces, will be described with reference to FIGS. 5*a* to 7. However, in the case of the touch sensor panel of FIG. 2, since not a normal touch signal but an LGM interference signal is generated when touching the touch sensor panel, the technical reason for the generation of the LGM interference signal will be first described with reference to FIGS. 3*a* to 3*e* and FIGS. 4*a* to 4*g* and an electrode arrangement form of the touch sensor panel 1 of the present invention for reducing the generation of the LGM interference signal will be described with reference to FIGS. 5*a* to 7. In addition, in FIGS. 3*a* to 3*e* and FIGS. 4*a* to 4*g*, traces are omitted in FIG. 2 and only the shape of the electrode is indicated by a number and simplified and indicated.

FIG. 3*a* illustrates an electrode arrangement form in which a plurality of the same receiving electrodes RX1 are arranged in the touch window area S so that a generation amount of the LGM interference signal is relatively increased. In the present invention, the same receiving electrodes refer to receiving electrodes connected to one trace by the same sensing terminal, and the same driving electrodes refer to driving electrodes connected to one trace by the same driving terminal.

In this case, as shown in FIG. 3*b*, when the surface of the touch sensor panel 1 is touched with the thumb, in a normal situation in which the low ground mass (LGM) interference signal is not generated as illustrated in FIG. 3*c* in a finger touch area (touch window area S), a final capacitance change amount ($\Delta$Ctotal) is constituted by only '+' capacitance value ($\Delta$Cm, e.g., >+250), but in a situation in which the LGM interference signal is generated, a lower final capacitance change amount ($\Delta$Ctotal, e.g., >50) is obtained by '−' LGM interference signal ($C_{LGM}$, e.g., >−200). That is, the LGM interference signal is defined as a signal that acts opposite to the '+' capacitance value, thereby reducing the finally obtained capacitance change amount ($\Delta$Ctotal).

Here, the normal situation exemplifies a situation in which a user touches the surface of the touch input device 1000 while gripping the touch input device 1000 and the finger acts as a normal ground. In addition, the situation in which the LGM interference signal is generated exemplifies a situation in which the surface of the touch input device 1000 is touched while the touch input device 1000 is placed on the floor and floating occurs, and as a result, the finger does not act as the normal ground.

For example, FIG. 3*d* illustrates a situation in which as a touch area of the thumb increases gradually, the number of the same receiving electrodes RX1 included in the corresponding touch area gradually increases (1 in state 1→3 in state 2→4 in state 3).

In the finger touch area, the final capacitance change amount ($\Delta$Ctotal) is constituted by only '+' capacitance value ($\Delta$Cm, +250) in the normal situation in which the LGM interference signal is not generated, but the final capacitance change amount ($\Delta$Ctotal) almost disappears in the situation in which the LGM interference signal is largely generated. As such, as the number of the same receiving electrodes RX1 included in the finger touch area increases, a magnitude of the LGM interference signal gradually increases, and as a result, it can be seen that the final capacitance change amount $\Delta$Ctotal almost disappears.

As a result, as illustrated in FIG. 4a, when the driving electrode and the receiving electrode are connected to a conductive object with a low ground, a separate current path is generated, and the TX signal is transmitted to the RX electrode through the path, and as a result, the LGM interference signal opposite to the normal touch signal is generated.

Meanwhile, as described above, according to the electrode arrangement form of the touch sensor panel of FIG. 3a, the plurality of the same receiving electrodes RX1 are arranged in the touch window area S so that the generation amount of the LGM interference signal is relatively increased. That is, when as illustrated in FIG. 4b, the number of the same receiving electrodes RX1 arranged in the touch area is large or as illustrated in FIG. 4c, the number of the same driving electrodes TX1 arranged in the touch area is large, it can be seen that the LGM interference signal is relatively increased. Accordingly, it is preferable to reduce the number of the same receiving electrodes RX1 arranged in the touch area as illustrated in FIG. 4d and reduce the number of the same driving electrodes TX1 arranged in the touch area as illustrated in FIG. 4e. For example, as illustrated in FIG. 4f, all first electrodes included in the touch window area S are separated from each other and connected to different first traces to reduce the aforementioned LGM interference signal, thereby enhancing touch sensitivity. In addition, when based on a principle to which the form of the touch sensor panel in which the LGM interference signal is reduced illustrated in FIG. 4f is applied, it is exemplified that the number of driving electrodes corresponding adjacent to one receiving electrode is 4, the electrode arrangement form may be configured as illustrated in FIG. 4g.

Likewise, according to the touch sensor panel 1 of FIGS. 5a to 7, all first electrodes included in the touch window area S are separated from each other and connected to different first traces to reduce the aforementioned LGM interference signal, thereby enhancing the touch sensitivity.

FIGS. 5a and 5b illustrates an electrode arrangement form of a touch sensor panel according to another embodiment of the present invention.

As illustrated in FIG. 5a, a touch sensor panel 1 according to a first embodiment of the present invention may include a plurality of first electrode arrays A1 to A8 and a plurality of second electrode arrays B1 to B16 extended in a row direction. In addition, as a whole, the first electrode arrays A1 to A8 and the plurality of second electrode arrays B1 to B16 may be arranged to cross each other. However, the second electrode arrays (e.g., B2 and B3) may be continuously arranged between the first electrode arrays A1 and A2, and the second electrode arrays (e.g., B2 and B3) continuously arranged between the first electrode arrays A1 and A2 may have an electrode horizontal length of approximately ½ as compared with the first electrode arrays A1 and A2. Such a feature may be applied even to other second electrode arrays (B4, B5, etc.) in the same/similar manner.

The plurality of first electrode arrays A1 to A8 may include a plurality of first electrodes RX0 to RX7, and the plurality of second electrode arrays B1 to B16 may include a plurality of second electrodes TX0 to TX15. In FIG. 5a, it is exemplified that the plurality of first electrodes RX0 to RX7 are sequentially arranged with a column direction as a priority, and the plurality of second electrodes TX0 to TX15 are also sequentially arranged with the column direction as the priority, but the scope of the present invention is not limited thereto.

In particular, in a state in which the other first electrode array A1 is arranged on one side of an arbitrary first electrode array A2 and another first electrode array A3 is arranged on the other side, when a plurality of second electrodes (TX0→TX1→TX2→TX3) included in the second electrode arrays B1 and B2 corresponding adjacent to the other first electrode array A1 are sequentially arranged in the column direction and a plurality of second electrodes (TX4→TX5→TX6→TX7) included in the second electrode arrays B5 and B6 corresponding adjacent to another first electrode array A3 are sequentially arranged in the column direction, a plurality of second electrodes (TX3→TX2→TX1→TX0) included in the second electrode arrays B3 and B4 may be sequentially arranged in the arbitrary first electrode array A2 arranged between the other first electrode array A1 and another first electrode array A3 in the column direction. In this case, the plurality of second electrodes (TX3→TX2→TX1→TX0) included in the second electrode arrays B3 and B4 are arranged in a reverse order to the plurality of second electrodes (TX0→TX1→TX2→TX3) included in the second electrode arrays B1 and B2.

However, FIG. 5a illustrates some of all touch sensor panels 1, and the remaining first electrodes and the remaining second electrodes may be further arranged in the column direction and the row direction. Further, in FIG. 5a, a first electrode having a relatively large size is assumed as the receiving electrode, and a second electrode having a relatively small size is assumed as the driving electrode, but the scope of the present invention is not limited thereto, and even though the first electrode is defined as the driving electrode and the second electrode is defined as the receiving electrode, the electrodes may be applied to the present invention in the same/similar manner.

In FIG. 5a, it illustrated that the electrode and the trace are separated from each other and formed as separate components, but according to an embodiment, the electrode and the trace may be integrated and formed in the form of a metal mesh. In this case, a dead zone in which the touch position such as between the electrode and the trace and/or between the electrode and another electrode is not detected is reduced, so that the sensitivity of detection of the touch position may be further enhanced. Based on any one RX0 of the first electrodes RX0 and RX1 included in the first electrode array A1 which is any one of the plurality of first electrode arrays A1 to A8 implemented on the same layer, at least two of the second electrodes TX0, TX1, TX2, and TX3 included in the second electrode array B2 which is any one of the plurality of second electrode arrays B1 to B16 may be arranged on one side to correspond adjacent to each other and at least two of the second electrodes TX0, TX1, TX2, and TX3 included in the second electrode array B1 which is the other one of the plurality of second electrode arrays B1 to B16 may be arranged on the other side to correspond adjacent to each other. However, this is not applied only to the first electrode array A1 and may be applied even to the remaining first electrode arrays A2 to A8 in the same/similar manner. Further, this is not applied only to the first electrode RX0 and may be applied even to the remaining first electrode RX1 in the same/similar manner.

Any one RX0 of the first electrodes RX0 and RX1 included in the first electrode array A1 may be connected to some (the first electrode RX0 included in the first electrode array A5) of the remaining first electrodes other than any one first electrode (the first electrode RX0 included in the first electrode array A1) of the plurality of first electrodes RX0 to RX7 included in the touch sensor panel 1 by using one first trace. That is, this means that the electrode RX0 is connected to the same sensing terminal.

Any one TX0 of the second electrodes TX0, TX1, TX2, and TX3 included in the second electrode array B2 may be connected to at least some (the second electrode TX0 included in the second electrode arrays B1 to B4) of the remaining second electrodes other than any one second electrode (the second electrode TX0 included in the second electrode array B2) of the plurality of second electrodes TX0 to TX15 included in the touch sensor panel 1 by using one second trace. That is, this means that the electrode TX0 is connected to the same driving terminal.

Meanwhile, in FIG. 5a, it is illustrated that the same first electrode is connected in the row direction and the same second electrode is connected in the column direction and the row direction, but the scope of the present invention is not limited thereto and the same first electrode may be implemented to be connected to at least one of the row direction and the column direction and the same second electrode may be implemented to be connected to at least one of the row direction and the column direction. For reference, the same first electrode means electrodes connected to the first trace and the same second electrode means electrodes connected to the second trace. For example, even if separate traces are directly connected to each of the same first electrodes (RX0 in column A1 and RX0 in column A5), the separate traces may be combined into one trace again and consequently connected to one receiving terminal. In addition, even if the separate traces are directly connected to each of the same second electrodes (TX0 in column B1 to column B4), the separate traces may be combined into one trace again and consequently connected to one driving terminal.

According to the structure of the touch sensor panel 1 of FIG. 5a, a plurality of driving electrodes are consequently connected to one driving terminal, and a plurality of receiving electrodes are consequently connected to one receiving terminal, thereby reducing the number of traces.

In particular, at least two of the second electrodes TX0, TX1, TX2, and TX3 are arranged adjacent to the first electrode RX0 and at least two of other second electrodes TX3, TX2, TX1, and TX0 are arranged to correspond adjacent to the other first electrode RX1, and then electrodes of the same number among the second electrodes TX0, TX1, TX2, and TX3 and other second electrodes TX3, TX2, TX1, and TX0 are connected by using one second trace, and as a result, the number of traces may be reduced compared to a structure in which a plurality of driving electrodes corresponding to one receiving electrode are connected by different traces as illustrated in FIG. 1d.

Meanwhile, some first electrodes RX0, RX3, RX4, and RX7 included in the touch window area S among the plurality of first electrodes RX0 to RX7 of the touch sensor panel 1 may be connected to different first traces, respectively.

In addition to reducing the LGM interference signal by separating all first electrodes RX0, RX3, RX4, and RX7 included in the touch window area S and connecting the first electrodes RX0, RX3, RX4, and RX7 by using different first traces, FIG. 5a illustrates that a result value acquired by multiplying the number of unit cells constituting the same driving electrodes TX arranged in the touch window area. S and the number of unit cells constituting the same receiving electrodes RX is minimized to reduce an effect of the LGM interference signal.

For example, compared with FIG. 4g, in the case of FIG. 4g, it can be seen that the number of unit cells (hatched) constituting the same receiving electrode RX4 in the touch window area S is 4, and the number of unit cells constituting the same driving electrode TX1 is 4, and a product thereof is 4*4=16. For reference, here, the unit cell is defined as a region of the same size as the relatively small TX electrode.

On the other hand, in the case of FIG. 5a, it can be seen that the number of unit cells (hatched) constituting the same receiving electrode RX4 in the touch window area S is 4, and the number of unit cells constituting the same driving electrode TX0 is 2, and a product thereof is 4*2=8. For reference, here, the unit cell is defined as a region of the same size as two TX electrodes having the relatively small size. In the case of FIG. 5a, since the number of unit cells is reduced by ½ compared to FIG. 4g, the magnitude of the LGM interference signal is also reduced by ½.

As a result, in the case of FIG. 5a, it is illustrated that the number of the same driving electrodes and/or the same receiving electrodes included in the touch window area S is reduced, and a result value acquired by multiplying the number of unit cells constituting the same driving electrodes TX arranged in the touch window area S and the number of unit cells constituting the same receiving electrode RX is minimized to less than 16 (a predetermined value), and as a result, the effect of the LGM interference signal is reduced.

However, the predetermined value (16) is only an embodiment of the present invention, and the scope of the present invention is not limited thereto, and the predetermined value may be defined as various numerical values.

Meanwhile, in the present invention, the touch window area S may be defined as an area larger than the touch area of the other fingers, like the touch area of the thumb. Specifically, the area of the touch window area S may be implemented with approximately 15 mm*15 mm or more and approximately 20 mm*20 mm or less, but preferably, the area may be implemented in a size of approximately 16 mm*16 mm. In particular, FIGS. 5a to 7 illustrate that the area of the touch window area S is implemented in the size of approximately 16 mm*16 mm.

Specifically, the area of the unit cell (hatched portion in FIG. 5a) may be implemented with approximately 4 mm (length)*2 mm (width). Thus, in the case of FIG. 5a, a vertical length of one RX electrode (the size of four unit cells) is approximately 16 mm, and a horizontal length is approximately 2 mm. In addition, the vertical length of the two TX electrodes (e.g., TX0 in column B2 and TX3 in column B3, the size of one unit cell) is approximately 4 mm, and the horizontal length is approximately 2 mm. In particular, FIG. 5a illustrates that the area of the touch window area S is implemented in the size of approximately 16 mm*16 mm. For reference, since the vertical length of TX0 in column B1 is approximately 4 mm, the horizontal length is approximately 1 mm, and the vertical length of TX0 in column B2 is approximately 4 mm and the horizontal length is approximately 1 mm, the combined area of the two electrodes becomes the area of one unit cell.

For example, referring to FIG. 5a, the touch window area S may include some RX0, RX3, RX4, and RX7 of the plurality of first electrodes RX0 to RX7 and some TX0 to TX7 of the plurality of second electrodes TX0 to TX15. Specifically, the touch window area S may be constituted by four consecutive first electrodes RX0, RX3, RX4, and RX7 in the row direction among the plurality of first electrodes RX0 to RX7 and eight consecutive second electrodes TX0 to TX3 or TX4 to TX7 corresponding adjacent to the four first electrodes RX0, RX3, RX4, and RX7, respectively in the column direction. For example, four consecutive second electrodes TX0 to TX3 may be arranged adjacent to each other in the column direction on one side of the first electrode RX0 and four consecutive second electrodes TX0 to TX3 may be arranged adjacent to each other in the column direction on the other side.

For example, a 1-1 electrode RX0 and a 1-2-th electrode RX1 may be arranged in the first electrode array A1. A 2-4' electrode TX3, a 2-3' electrode TX2, a 2-2' electrode TX1, and a 2-1' electrode TX0 may be arranged to correspond adjacent to a 2-1 electrode TX0, a 2-2 electrode TX1, a 2-3 electrode TX2, a 2-4 electrode TX3, and a 1-2 electrode RX1 corresponding adjacent to the 1-1 electrode RX0 in the second electrode array B2. In addition, the 2-1 electrode TX0 and the 2-1' electrode TX0 may be electrically connected to each other by using a 2-1 trace, the 2-2 electrode TX1 and the 2-2' electrode TX1 may be electrically connected to each other by using a 2-2 trace, the 2-3 electrode TX2 and the 2-3' electrode TX2 may be electrically connected to each other by using a 2-3 trace, and the 2-4 electrode TX3 and the 2-4' electrode TX3 may be electrically connected to each other, by using a 2-4 trace. In addition, mutual capacitance may be generated between the 1-1 electrode RX0 and the 2-1 electrode TX0 and the mutual capacitance may be generated between the 1-2 electrode RX1 and the 2-4' electrode TX3. Likewise, the mutual capacitance may be generated between the 1-1 electrode RX0 and the 2-2 electrode TX1, between the 1-1 electrode RX0 and the 2-3 electrode TX2, and between the 1-1 electrode RX0 and the 2-4 electrode TX3 and the mutual capacitance may be generated even between the 1-2 electrode RX1 and the 2-3' electrode TX2, between the 1-2 electrode RX1 and the 2-2' electrode TX1, and between the 1-2 electrode RX1 and the 2-1' electrode TX0.

However, such a feature is not applied only between column A1 and column B2 arranged on the right side of column A1, and may be applied even between column A1 and column B1 arranged on the left side of column A1 in the same/similar manner. In addition, such a feature is not applied only between column A1 and column B2 and may be applied even between the remaining first electrode array and the remaining second electrode array in the same/similar manner.

In the touch sensor panel 1 of FIG. 5a, the second electrode array B2 may be arranged on one side of any one of the first electrodes RX0 and RX1 included in the first electrode array A1 and the other second electrode array B1 may be arranged on the other side. In addition, any one of the second electrodes TX0, TX1, TX2, and TX3 included in the second electrode array B2 and any one of the second electrodes TX0, TX1, TX2, and TX3 included in the other second electrode array B1 may be arranged in the same row around any one RX0 of the first electrodes RX0 and RX1. Here, any one of the second electrodes TX0, TX1, TX2, and TX3 included in the second electrode array B2 arranged in the same row and any one of the second electrodes TX0, TX1, TX2, and TX3 included in the other second electrode array B1 may be connected by using the second trace.

That is, two identical second electrodes having a relatively small size may be arranged adjacent to the left and right sides around the first electrode having a relatively large size. Each of two identical second electrodes may be arranged on the same line. However, in FIG. 5a, it is illustrated that the same second electrode having the relatively small size is arranged around the first electrode having the relatively large size, but according to another embodiment, the same first electrode having the relatively large size may be implemented to be arranged around the second electrode having the relatively small size.

In addition, although FIG. 5a illustrates that the second electrodes are arranged adjacent to the left and right sides around the first electrode, the second electrodes may be implemented to be arranged adjacent to each other on the upper and lower sides around the first electrode in some embodiments.

Meanwhile, in the above-described example, it is exemplified that any one of the second electrodes TX0, TX1, TX2, and TX3 included in the second electrode array B2 arranged in the same row and any one of the second electrodes TX0, TX1, TX2, and TX3 included in the other second electrode array B1 are connected by using the same second trace, but according to an embodiment, any one of the second electrodes TX0, TX1, TX2, and TX3 included in the second electrode array B2 arranged in the same row and any one of the second electrodes TX0, TX1, TX2, and TX3 included in the other second electrode array B1 may be implemented to be connected by using different second traces. That is, all of the second electrodes arranged on the same line on the left and right sides of the first electrode may be implemented to be different from each other.

In other words, the second electrodes arranged around the first electrode may be implemented to be all the same or different. When implemented as such, it is possible to improve the effect of splitting the result value of a capacitance signal due to the LGM interference signal compared to implementing some of the second electrodes arranged around the first electrode in the same manner and the remaining second electrodes differently.

Improvement of the result value splitting effect of the capacitance signal will be described below with reference to FIGS. 3e and 3c.

For example, in the case of the electrode arrangement pattern illustrated in FIG. 3e, it can be seen that the TX electrodes arranged adjacent to the same RX electrode on the left and right sides and the TX electrodes arranged adjacent to different RX electrodes on the left and right sides are mixed. For example, it can be seen that the same RX1 electrodes are arranged on the left and right sides in the case of the TX5 electrode and the TX9 electrode arranged on the left side of the TX13 electrode in the touch window area S and the same RX9 electrodes are arranged on the left and right sides in the case of the TX1 electrode and the TX5 electrode arranged on the right side around the TX13 electrode in a dotted line area. On the other hand, it can be seen that in the case of the TX13 electrode located at the center of the touch sensor panel 1, different RX1 electrodes and RX9 electrodes are arranged on the left and right sides. In this case, the effect of splitting the result value of the capacitance signal due to the LGM interference signal is generated on a boundary surface of the TX1 electrode and the TX9 electrode in which the same RX electrodes are arranged on the left and right sides which are hatched regions of FIG. 3e and the TX13 electrode in which different RX electrodes are arranged on the left and right sides.

Specifically, it can be seen that in the case of each of the TX5 electrode and the TX9 electrode arranged on the left side of the TX13 electrode, the number of RX1 electrodes that generate the LGM interference signal is 3 (determined based on the dotted line area) and in the case of each of the TX1 electrode and the TX5 electrode arranged on the right side of the TX13 electrode, the number of RX9 electrodes that generate the LGM interference signal is 3, whereas in the case of the TX13 electrode, the total number of RX electrodes that generate the LGM interference signal is 6 (3 RX1s+3 RX9s). That is, since the magnitude of the LGM interference signal suddenly increases at a center point of the touch sensor panel 1 including the TX13 electrode, the magnitude of the final capacitance change (ΔCtotal) obtained accordingly decreases significantly, and as a result, a graph showing the splitting of the result value of the capacitance signal as illustrated in 3c is derived.

Since the result value splitting effect of the capacitance signal is generated when the TX electrodes arranged adjacent to the same RX electrode on the left and right sides and the TX electrode arranged adjacent to different RX electrodes on the left and right sides are mixed as illustrated in FIG. 3e, when all second electrodes arranged around the first electrode are implemented to be the same or different as illustrated in FIG. 5a, the result value splitting effect of the capacitance signal due to the LGM interference signal may be improved.

Meanwhile, as illustrated in FIG. 5b, the touch sensor panel 1 may include the touch window area S and an adjacent touch area S' arranged adjacent to the touch window area S in the column direction among the remaining touch areas. In addition, the adjacent touch area S' is defined as an area having the same size as the touch window area S'.

In this case, each of the second electrodes TX0-TX1-TX2-TX3 included in the touch window area S among the second electrodes TX0-TX1-TX2-TX3-TX3-TX2-TX1-TX0 included in the second electrode array B2 may be repeatedly arranged like TX3-TX2-TX1-TX0 in the adjacent touch area. S' among the second electrodes TX0-TX1-TX2-TX3-TX3-TX2-TX1-TX0 included in the second electrode array B2.

In other words, the same TX electrodes may be arranged in the column direction.

In particular, as illustrated in FIG. 5b, one TX3 (dot pattern) of the second electrodes TX0-TX1-TX2-TX3 included in the touch window area S among the second electrodes TX0-TX1-TX2-TX3-TX3-TX2-TX1-TX0 included in the second electrode array B2 and one TX3 (dot pattern) of the second electrodes TX3-TX2-TX1-TX0 included in the adjacent touch area S' among the second electrodes TX0-TX1-TX2-TX3-TX3-TX2-TX1-TX0 included in the second electrode array B2 may be arranged adjacent to each other and the second electrodes TX3 and TX3 arranged adjacent to each other may be connected by using the second trace. In other words, it is possible to design the electrode arrangement form with a structure in which the TX electrodes are arranged in a first order in the touch window area S and arranged in a reverse order to the first order in the adjacent touch area S'.

However, although not illustrated in the figure, it is possible to design the electrode arrangement form with a structure in which the TX electrodes are arranged in the first order in the touch window area S and arranged in the same order as the first order even in the adjacent touch area S' according to another embodiment.

In this case, one TX3 of the second electrodes TX0-TX1-TX2-TX3 included in the touch window area S among the second electrodes TX0-TX1-TX2-TX3-TX0-TX1-TX2-TX3 included in the second electrode array B2 and one TX0 of the second electrodes TX0-TX1-TX2-TX3 included in the adjacent touch area S' among the second electrodes TX0-TX1-TX2-TX3-TX0-TX1-TX2-TX3 included in the second electrode array B2 may be arranged adjacent to each other and the second electrodes TX3 and TX0 arranged adjacent to each other may be connected by using different second traces.

Meanwhile, referring to FIG. 5a, when a touch by an object occurs while a driving signal is applied to the touch sensor panel 1, a mutual capacitance signal value (ΔCm) is detected between a predetermined TX electrode and an RX electrode arranged adjacent to the predetermined TX electrode, but the mutual capacitance signal value (ΔCm) is not detected between the predetermined TX electrode and an RX electrode spaced apart from the predetermined TX electrode, and as a result, noise generated from an adjacent electrode may be eliminated by using a separate noise signal generated from a spaced electrode where the capacitance signal value ΔCm is not generated.

For example, the control unit 13 detects the mutual capacitance signal value (ΔCm) between TX0 of column B3 and TX0 of column B4 and RX3 of column A2 on the touch window area S, and also detects a predetermined display noise signal. On the other hand, between TX0 of column B3 and TX0 of column B4 and RX4 of column A3 or between TX0 of column B3 and TX0 of column B4 and RX7 of column A4, the mutual capacitance signal value (ΔCm) is not detected, but only a predetermined display noise signal is detected.

In other words, by subtracting a display noise signal value detected between TX0 of column B3 and TX0 of column B4 and RX4 of column A3 or between TX0 of column B3 and TX0 of column B4 and RX7 of column A4 from a signal value (mutual capacitance signal value (ΔCm)+display noise signal value) detected between TX0 of column B3 and TX0 of column B4 and RX3 of column A2, only a pure mutual capacitance signal value (ΔCm) may be obtained.

According to another embodiment, between TX0 of column B3 and TX0 of column B4 and RX4 of column A3 or between TX0 of column B3 and TX0 of column B4 and RX7 of column A4, other noise signals (e.g., noise and/or LGM interference signal generated according to image conversion on the display) may also be generated in addition to the display noise signal value and in this case, only the pure mutual capacitance signal value (ΔCm) may be obtained by subtracting the other noise signal value from the mutual capacitance signal value (ΔCm) generated between TX0 in column B3 and TX0 in column B4 and RX3 in column A2 and other noise signal value.

As a result, in a process of detecting the mutual capacitance signal value, it is possible to remove the noise from an actual reception channel by using a display noise signal detection characteristic of a dummy reception channel that is not used.

Meanwhile, in the above description, a case where the predetermined TX electrode is TX0 in column B3 and TX0 in column B4 is exemplified, but the scope of the present invention is not limited thereto, and when the conditions of the adjacent RX electrode and the spaced RX electrode are satisfied, the scope of the present invention may be applied to other TX electrodes in the touch area S by the object in the same/similar manner. In addition, although the touch area S by the object is described in the above description, but the scope of the present invention is not limited thereto and the scope of the present invention may be applied to all regions in the touch sensor panel 1 in the same/similar manner.

In addition, the above description may be applied individually to the display noise signal value, the noise signal value generated by image conversion on the display, and the LGM interference signal value, but according to an embodiment, at least one of the display noise signal value, the noise signal value generated according to image conversion on the display, and the LGM interference signal value may be together applied.

FIGS. 6a and 6b illustrates an electrode arrangement form of a touch sensor panel 1 according to another embodiment of the present invention.

Prior to the detailed description, although FIGS. 6a and 6b does not draw a separate trace differently from FIGS. 5a, 5b and 7, it should be understood that the trace is actually installed as illustrated in FIGS. 5a, 5b and 7. Further, the driving electrode and the receiving electrode, and the touch window area S of FIGS. 6a and 6b have the same sizes as the driving electrode and the receiving electrode, and the touch window area S of FIGS. 5a, 5b, and 7, respectively.

As illustrated in FIG. 6a, a touch sensor panel 1 according to a first embodiment of the present invention may include a plurality of first electrode arrays A1 to A17 and a plurality of second electrode arrays B1 to B16 extended in the row direction. In addition, as a whole, the first electrode arrays A1 to A17 and the plurality of second electrode arrays B1 to B16 may be arranged to cross each other. According to an embodiment, the receiving electrodes arranged in some arrays A1 and A17 arranged on both ends among the plurality of first electrode arrays A1 to A17 may be implemented to have a horizontal length of approximately ½ as compared with the receiving electrodes arranged in other arrays A2 to A16. However, this is only an embodiment, and all of the receiving electrodes of the plurality of first electrode arrays A1 to A17 may be implemented to have the same size.

The plurality of first electrode arrays A1 to A17 may include a plurality of first electrodes RX0 to RX15, and the plurality of second electrode arrays B1 to B16 may include a plurality of second electrodes TX0 to TX31. In FIG. 6a, it is exemplified that the plurality of first electrodes RX0 to RX15 are sequentially arranged with the column direction as the priority, and the plurality of second electrodes TX0 to TX31 are also sequentially arranged with the column direction as the priority, but the scope of the present invention is not limited thereto.

FIG. 6a illustrates some of all touch sensor panels 1, and the remaining first electrodes and the remaining second electrodes may be further arranged in the column direction and the row direction. Further, in FIG. 6a, a first electrode having a relatively large size is assumed as the receiving electrode, and a second electrode having a relatively small size is assumed as the driving electrode, but the scope of the present invention is not limited thereto, and even though the first electrode is defined as the driving electrode and the second electrode is defined as the receiving electrode, the electrodes may be applied to the present invention in the same/similar manner.

In FIG. 6a, it illustrated that the electrode and the trace are separated from each other and formed as separate components, but according to an embodiment, the electrode and the trace may be integrated and formed in the form of a metal mesh. In this case, a dead zone in which the touch position such as between the electrode and the trace and/or between the electrode and another electrode is not detected is reduced, so that the sensitivity of detection of the touch position may be further enhanced.

Referring to FIG. 6a, on one side of any one of the first electrodes RX3 and RX2 included in the first electrode array A2 which is any one of the plurality of first electrode arrays A1 to A11 implemented on the same layer, at least two of the second electrodes TX8 to TX15 included in the second electrode array B2 which is any one of the plurality of second electrode arrays B1 to B16 may be arranged to correspond adjacent to each other. However, this is not applied only to the first electrode array A1 and may be applied even to the remaining first electrode arrays A1, and A13 to A17 in the same/similar manner. Further, this is not applied only to the first electrode RX3 and may be applied even to the remaining first electrode RX2 in the same/similar manner.

Any one RX3 of the first electrodes RX3 and RX2 included in the first electrode array A2 may be connected to some (the first electrode RX3 included in the first electrode array A10) of the remaining first electrodes other than any one first electrode (the first electrode RX3 included in the first electrode array A2) of the plurality of first electrodes RX0 to RX15 included in the touch sensor panel 1 by using the first trace. That is, this means that the electrode RX3 is connected to the same sensing terminal.

Any one TX15 of the second electrodes TX8 to TX15 included in the second electrode array B2 may be connected to at least some (the second electrode TX15 included in the second electrode arrays B2, B6, B12, and B16) of the remaining second electrodes other than any one second electrode (the second electrode TX15 included in the second electrode array B2) of the plurality of second electrodes TX0 to TX31 included in the touch sensor panel 1 by using the second trace. That is, this means that the electrode TX15 is connected to the same driving terminal.

Meanwhile, in FIG. 6a, it is illustrated that the same first electrode is connected in the row direction and the same second electrode is connected in the column direction and the row direction, but the scope of the present invention is not limited thereto and the same first electrode may be implemented to be connected to at least one of the row direction and the column direction and the same second electrode may be implemented to be connected to at least one of the row direction and the column direction. For reference, the same first electrode means electrodes connected to the first trace and the same second electrode means electrodes connected to the second trace. For example, even if separate first traces are directly connected to each of the same first electrodes (RX3 in column A2 and RX3 in column A10), the separate first traces may be combined into one first trace again and consequently connected to one receiving terminal. In addition, even if separate second traces are directly connected to each of the same second electrodes (second electrode TX15 included in columns B2, B6, B12, and B16), the separate second traces may be combined into one trace again and consequently connected to one driving terminal.

According to the structure of the touch sensor panel 1 of FIG. 6a, a plurality of driving electrodes are consequently connected to one driving terminal, and a plurality of receiving electrodes are consequently connected to one receiving terminal, thereby reducing the number of traces.

In particular, at least two of the second electrodes TX15 to TX8 are arranged to correspond adjacent to each other the first electrode RX3 and at least two of other second electrodes TX8 to TX15 are arranged to correspond adjacent to each other in the other first electrode RX2, and then electrodes of the same number among the second electrodes TX15 to TX8 and other second electrodes TX8 to TX15 are connected by using one second trace, and as a result, the number of traces may be reduced compared to a structure in which a plurality of driving electrodes corresponding to one receiving electrode are connected by different traces as illustrated in FIG. 1d.

Meanwhile, some first electrodes RX0, RX3, RX4, RX7, and RX8 included in a touch window area S among the plurality of first electrodes RX0 to RX15 of the touch sensor panel 1 may be connected to different first traces, respectively.

In addition to reducing the LGM interference signal by separating all first electrodes RX0, RX3, RX4, and RX7 included in the touch window area S and connecting the first electrodes RX0, RX3, RX4, and RX7 by using different first traces, FIG. 6a illustrates that a result value acquired by multiplying the number of unit cells constituting the same driving electrodes TX arranged in the touch window area S and the number of unit cells constituting the same receiving electrodes RX is minimized to reduce an effect of the LGM interference signal.

For example, compared with FIG. 4g, in the case of FIG. 4G=g, it can be seen that the number of unit cells (hatched) constituting the same receiving electrode RX4 in the touch window area S is 4, and the number of unit cells constituting the same driving electrode TX1, is 4, and a product thereof is 4*4=16. For reference, here, the unit cell is defined as a region of the same size as the relatively small TX electrode.

On the other hand, in the case of FIG. 6a, it can be seen that the number of unit cells (hatched) constituting the same receiving electrode RX7 in the touch window area S is 4, and the number of unit cells constituting the same driving electrode TX15 is 1, and a product thereof is 4*1=4. For reference, here, the unit cell is defined as a region of the same size as the TX electrode having a relatively smaller size than the RX electrode. In the case of FIG. 6a, since the number of unit cells is reduced compared to FIG. 4g, the magnitude of the LGM interference signal is also reduced in proportion to the reduced number. However, more specifically, in the case of FIG. 6a, the receiving electrode RX3 arranged adjacent to the left side of the same driving electrode TX15 in the touch window area S and the receiving electrode RX4 arranged adjacent to the right side are different and each of capacitance values corresponding to a coordinate of the receiving electrode RX3 arranged adjacent to the left side of the driving electrode TX15 and a coordinate of the receiving electrode RX4 arranged adjacent to the right side is first calculated and then, the calculated capacitance values corresponding to the left and right coordinates are added to calculate the final capacitance value. Therefore, to be precise, the number of unit cells constituting the same driving electrode TX15 is 1, but in calculating the capacitance value, the number is calculated as two and a product of the unit cells constituting the same receiving electrode RX7 and the unit cells constituting the same driving electrode TX15 in the touch window area S may be calculated as 4*2=8. In the case, since the number of unit cells is reduced by ½ compared to FIG. 4g, the magnitude of the LGM interference signal is also reduced by ½ in proportion to the reduced number.

As a result, FIG. 6a illustrated that the number of the same driving electrodes and/or the same receiving electrodes included in the touch window area S is reduced, and a result value acquired by multiplying the number of unit cells constituting the same driving electrodes TX arranged in the touch window area S and the number of unit cells constituting the same receiving electrode RX is minimized to less than 16 (a predetermined value), and as a result, the effect of the LGM interference signal is reduced.

However, the predetermined value (16) is only an embodiment of the present invention, and the scope of the present invention is not limited thereto, and the predetermined value may be defined as various numerical values.

Meanwhile, in the present invention, the touch window area S may be defined as an area larger than the touch area of the other fingers, like the touch area of the thumb. Specifically, the area of the touch window area S may be implemented with approximately 15 mm*15 mm or more and approximately 20 mm*20 mm or less, but preferably, the area may be implemented in a size of approximately 16 mm*16 mm. In particular, FIGS. 5a to 7 illustrate that the area of the touch window area S is implemented in the size of approximately 16 mm*16 mm.

Specifically, the area of the unit cell (hatched portion in FIG. 6a) may be implemented with approximately 4 mm (length)*2 mm (horizontal). Thus, in the case of FIG. 6a, a vertical length of ½ of one RX electrode (the size of eight unit cells) is approximately 16 mm, and a horizontal length is approximately 2 mm. In addition, a vertical length of one TX electrode (the size of one unit cell) is approximately 4 mm, and a horizontal length is approximately 2 mm. Accordingly, FIG. 6a illustrates that the area of the touch window area S is implemented in the size of approximately 16 mm*16 mm.

For example, referring to FIG. 6a, the touch window area S may include some RX0, RX3, RX4, RX7, and RX8 of the plurality of first electrodes RX0 to RX15 and some TX0 to TX3, TX12 to TX15, TX16 to TX19, and TX28 to TX31 of the plurality of second electrodes TX0 to TX31. Specifically, the touch window area S may be constituted by five consecutive first electrodes RX0, RX3, RX4, RX7, and RX8 in the row direction among the plurality of first electrodes RX0 to RX15 and four consecutive second electrodes TX0 to TX3, TX12 to TX15, TX16 to TX19, or TX28 to TX31 corresponding adjacent to at least one RX0, RX3, RX4, or RX7 among the five first electrodes RX0, RX3, RX4, RX7, and RX8 in the column direction. For example, four consecutive second electrodes TX12 to TX15 may be arranged adjacent to each other in the column direction on one side of the first electrode RX3.

For example, the 1-1-th electrode RX3 and the 1-2-th electrode RX2 may be arranged in the first electrode array A2. In the second electrode array B2, the 2-1 electrode TX15 to the 2-8 electrode TX8 corresponding adjacent to the 1-1 electrode RX3 and the 2-8' electrode TX8 to the 2-1' electrode TX15 corresponding adjacent to the 1-2 electrode RX2 may be arranged. In addition, the 2-1 electrode TX15 and the 2-1' electrode TX15 may be electrically connected to each other by the 2-1 trace and the 2-2 electrode TX14 and the 2-2' electrode TX14 may be electrically connected to each other using the 2-2 trace, and the same may be applied to the remaining electrodes.

In addition, the mutual capacitance may be generated between the 1-1 electrode RX3 and the 2-1 electrode TX15 and the mutual capacitance may be generated between the 1-2 electrode RX2 and the 2-8' electrode TX8. Likewise, the mutual capacitance may be generated even between the 1-1 electrode RX3 and the 2-2 electrode TX14 to the 2-8 electrode TX8 and the mutual capacitance may be generated even between the 1-2 electrode RX2 and the 2-7' electrode TX9 to the 2-1' electrode TX15.

However, such a feature is not applied only between column A2 and column 32 arranged on the right side of column A2, and may be applied even between column A2 and column B1 arranged on the left side of column A2 in the same/similar manner. In addition, such a feature is not applied only between column A2 and column B2 and may be applied even between the remaining first electrode array and the remaining second electrode array in the same/similar manner.

In the touch sensor panel 1 of FIG. 6a, the second electrode array B2 may be arranged on one side of any one RX3 of the first electrodes RX3 and RX2 included in the first electrode array A2 and the other second electrode array B1 may be arranged on the other side. In addition, any one TX15 of the second electrodes TX15 to TX8 included in the second electrode array B2 and any one TX0 of the second electrodes TX0 to TX7 included in the other second electrode array B1 may be arranged in the same row around any one RX3 of the first electrodes RX3 and RX2. Here, TX0 and TX15 arranged in the same row may be connected to different second traces, respectively.

That is, two different second electrodes having a relatively small size may be arranged adjacent the left and right sides centering on the first electrode having a relatively large size. Each of two different second electrodes may be arranged on the same line.

However, in FIG. 6a, it is illustrated that the same second electrode having the relatively small size is arranged centering on the first electrode having the relatively large size, but according to another embodiment, different first electrodes having the relatively large size may be implemented to be arranged centering on the second electrode having the relatively small size.

In addition, although FIG. 6a illustrates that the second electrodes are arranged adjacent to the left and right sides around the first electrode, the second electrodes may be implemented to be arranged adjacent to each other on the upper and lower sides around the first electrode in some embodiments.

Meanwhile, in the aforementioned example, it is exemplified that TX15 included in the second electrode array B2 and TX0 included in the other second array B1 arranged in the same row are connected by using different second traces, but according to an embodiment, TX15 and TX0 may be implemented to be connected by using the same second trace. That is, all of the second electrodes arranged on the same line on the left and right sides of the first electrode may be implemented to be the same as each other.

In other words, the second electrodes arranged around the first electrode may be implemented to be all the same or different. When implemented as such, it is possible to improve the effect of splitting the result value of a capacitance signal due to the LGM interference signal compared to implementing some of the second electrodes arranged around the first electrode in the same manner and the remaining second electrodes differently and this is described above with reference to FIGS. 3e and 3c.

Meanwhile, as illustrated in FIG. 6b, the touch sensor panel 1 may include the touch window area S and an adjacent touch area S' arranged adjacent to the touch window area S in the column direction among the remaining touch areas. In addition, the adjacent touch area S' is defined as an area having the same size as the touch window area S and the remaining touch areas may include other touch window areas S1 and S2 having the same size as the touch window area S in addition to the adjacent touch area S'. Here, other touch window areas S1 and S2 may be arranged adjacent to the adjacent touch area S' in the column direction.

In this case, each of the second electrodes TX15 to TX12 included in the touch window area S among the second electrodes TX15 to TX8 and TX8 to TX15 included in the second electrode array B2 and each of the second electrodes TX11 to TX8 included in the adjacent touch area S' may be repeatedly arranged like TX8 to TX11 in a first other touch window area S1 and TX12 to TX15 in a second other touch window area S2.

In other words, the same TX electrodes may be arranged in the column direction.

In particular, as illustrated in FIG. 6b, among the second electrodes TX15 to TX8 and TX8 to TX15 included in the second electrode array B2, one TX8 (dot pattern) of respective second electrodes TX15 to TX8 included in the touch window area S and the adjacent touch area S' and one TX8 (dot pattern) of respective second electrodes TX8 to TX15 included in other touch window areas S1 and S2 may be arranged adjacent to each other and the second electrodes TX8 and TX8 arranged adjacent to each other may be connected by using the second trace. In other words, it is possible to design an electrode arrangement form with a structure in which the TX electrodes are arranged in a first order in an area including the touch window area S and the adjacent touch area S' and arranged in a reverse order to the first order in other touch window areas S1 and S2.

However, although not illustrated in the figure, according to another embodiment, it is possible to design an electrode arrangement form with a structure in which the TX electrodes are arranged in a first order in an area including the touch window area S and the adjacent touch area S' and arranged in the same order as the first order in other touch window areas S1 and S2.

In this case, among the second electrodes TX15 to TX8 and TX8 to TX15 included in the second electrode array B2, one TX8 of respective second electrodes TX15 to TX8 included in the touch window area S and the adjacent touch area S' and one TX15 of respective second electrodes TX15 to TX8 included in other touch window areas S1 and S2 may be arranged adjacent to each other and the second electrodes TX8 and TX15 arranged adjacent to each other may be connected by using the different second trace.

Meanwhile, referring to FIG. 6a, when a touch by an object occurs while a driving signal is applied to the touch sensor panel 1, a mutual capacitance signal value ($\Delta$Cm) detected between a predetermined TX electrode and an RX electrode arranged adjacent to the predetermined TX electrode, but the mutual capacitance signal value ($\Delta$Cm) is not detected between the predetermined TX electrode and an RX electrode spaced apart from the predetermined TX electrode, and as a result, noise generated from an adjacent electrode may be eliminated by using a separate noise signal generated from a spaced electrode where the capacitance signal value $\Delta$Cm is not generated.

For example, the control unit 13 detects the mutual capacitance signal value ($\Delta$Cm) between TX15 of column B2 and RX3 of column A2 and RX4 of column A3 on the touch window area. S, and also detects a predetermined display noise signal. On the other hand, between TX15 in column B2 and RX0 in column A1 or RX7 in column A4 or RX8 in column A5, the mutual capacitance signal value ($\Delta$Cm) is not detected, but only a predetermined display noise signal is detected.

In other words, by subtracting a display noise signal value detected between TX15 of column B2 and RX0 of column A1 or RX7 of column A4 or RX8 of column A5 from a signal value (mutual capacitance signal value ($\Delta$Cm)+display noise signal value) detected between TX15 of column 32 and RX3 of column A2 and RX4 of column A3, only the pure mutual capacitance signal value ($\Delta$Cm) may be obtained.

According to another embodiment, between TX15 of column B2 and RX0 of column A1 or RX7 of column A4 or RX8 of column A5, other noise signals (e.g., noise and/or LGM interference signal generated according to image conversion on the display) may also be generated in addition to the display noise signal value and in this case, only the pure mutual capacitance signal value (ΔCm) may be obtained by subtracting the other noise signal value from the mutual capacitance signal value (ΔCm) generated between TX15 in column B2 and RX3 in column A2 and RX4 in column A3 and other noise signal value.

As a result, in a process of detecting the mutual capacitance signal value, it is possible to remove the noise from an actual reception channel by using a display noise signal detection characteristic of a dummy reception channel that is not used.

Meanwhile, in the above description, a case where the predetermined TX electrode is TX15 in column B2 is exemplified, but the scope of the present invention is not limited thereto, and when the conditions of the adjacent RX electrode and the spaced RX electrode are satisfied, the scope of the present invention may be applied to other TX electrodes in the touch area S by the object in the same/similar manner. In addition, although the touch area S by the object is described in the above description, but the scope of the present invention is not limited thereto and the scope of the present invention may be applied to all regions in the touch sensor panel 1 in the sane/similar manner.

In addition, the above description may be applied individually to the display noise signal value, the noise signal value generated by image conversion on the display, and the LGM interference signal value, but according to an embodiment, at least one of the display noise signal value, the noise signal value generated according to image conversion on the display, and the LGM interference signal value may be together applied.

FIG. 7 is a diagram referred to for describing a touch sensor panel 1 according to another embodiment of the present invention.

As illustrated in FIG. 7, a touch sensor panel 1 according to another embodiment of the present invention may include a plurality of first electrode arrays A1 to A8 and a plurality of second electrode arrays B1 to B12 extended in the row direction. In addition, as a whole, the first electrode arrays A1 to A8 and the plurality of second electrode arrays B1 to B12 may be arranged to cross each other. However, some second electrode arrays B3 and B4, B6 and B7, or B9 and B 10 may be consecutively arranged between the plurality of first electrode arrays A1 to A8.

The plurality of first electrode arrays A1 to A8 may include a plurality of first electrodes RX0 to RX7, and the plurality of second electrode arrays B1 to B12 may include a plurality of second electrodes TX0 to TX15. In FIG. 7, it is exemplified that the plurality of first electrodes RX0 to RX7 are sequentially arranged in the column direction and the plurality of second electrodes TX0 to TX15 are sequentially arranged in the row direction, but the scope of the present invention is not limited thereto.

However, FIG. 7 illustrates some of all touch sensor panels 1, and the remaining first electrodes and the remaining second electrodes may be further arranged in the column direction and the row direction. Further, in FIG. 7, a first electrode having a relatively large size is assumed as the receiving electrode, and a second electrode having a relatively small size is assumed as the driving electrode, but the scope of the present invention is not limited thereto, and even though the first electrode is defined as the driving electrode and the second electrode is defined as the receiving electrode, the electrodes may be applied to the present invention in the same/similar manner.

In FIG. 7, it illustrated that the electrode and the trace are separated from each other and formed as separate components, but according to an embodiment, the electrode and the trace may be integrated and formed in the form of a metal mesh. In this case, a dead zone in which the touch position such as between the electrode and the trace and/or between the electrode and another electrode is not detected is reduced, so that the sensitivity of detection of the touch position may be further enhanced.

In any one RX0 of the first electrodes RX0 and RX1 included in the first electrode array A1 which is any one of the plurality of first electrode arrays A1 to A8, at least two of the second electrodes TX0, TX7, TX8, and TX15 included in the second electrode array B2 which is any one of the plurality of second electrode arrays B1 to B12 may be arranged to correspond adjacent to each other. However, this is not applied only to the first electrode array A1 and may be applied even to the remaining first electrode arrays A2 to A8 in the same/similar manner. Further, this is not applied only to the first electrode RX0 and may be applied even to the remaining first electrode RX1 in the same/similar manner.

Any one RX0 of the first electrodes RX0 and RX1 included in the first electrode array A1 may be connected to some (the first electrode RX0 included in the first electrode array A5) of the remaining first electrodes other than any one first electrode (the first electrode RX0 included in the first electrode array A1) of the plurality of first electrodes RX0 tip RX7 included in the touch sensor panel 1 by using one first trace. That is, this means that the electrode RX0 is connected to the same sensing terminal.

Any one TX0 of the second electrodes TX0, TX7, TX8, and TX15 included in the second electrode array B2 may be connected to at least some (the second electrode TX0 included in the second electrode arrays B1 to B3) of the remaining second electrodes other than any one second electrode (the second electrode TX0 included in the second electrode array B2) of the plurality of second electrodes TX0 to TX3, TX4 to TX11, or TX12 to TX15 included in the touch sensor panel 1 by using one second trace. That is, this means that the electrode TX0 is connected to the same driving terminal.

Meanwhile, in FIG. 7, it is illustrated that the same first electrode is collected in the rove direction the same second electrode is connected in the column direction and the row direction, but the scope of the present invention is not limited thereto and the same first electrode may be implemented to be connected to at least one of the row direction and the column direction and the same second electrode may be implemented to be connected to at least one of the row direction and the column direction. For reference, the same first electrode means electrodes connected to the first trace and the same second electrode means electrodes connected to the second trace. For example, even if separate traces are directly connected to each of the same first electrodes (RX0 in column A1 and RX0 in column A5), the separate traces may be combined into one trace again and consequently connected to one receiving terminal. In addition, even if the separate traces are directly connected to each of the same second electrodes (TX0 in column B1, TX0 in column B2, and TX0 in column B3), the separate traces may be combined into one trace again and consequently connected to one driving terminal.

According to the structure of the touch sensor panel 1 of FIG. 7, a plurality of driving electrodes are connected to one driving terminal, and a plurality of receiving electrodes are connected to one receiving terminal, thereby reducing the number of traces.

In particular, at least two of the second electrodes TX0, TX7, TX8, and TX15 are arranged adjacent to the first electrode RX0 and at least two of other second electrodes TX15, TX8, TX7, and TX0 are arranged to correspond adjacent to the other first electrode RX1, and then electrodes of the same number among the second electrodes TX0, TX7, TX8, and TX15 and other second electrodes TX15, TX8, TX7, and TX0 are connected by using one second trace, and as a result, the number of traces may be reduced compared to a structure in which a plurality of driving electrodes corresponding to one receiving electrode are connected by different traces as illustrated in FIG. 1d.

Meanwhile, some first electrodes RX0, RX3, RX4, and RX7 included in the touch window area S among the plurality of first electrodes RX0 to RX7 of the touch sensor panel 1 may be connected to different first traces, respectively.

All of the first electrodes RX0, RX3, RX4, and RX7 included in the touch window area S are separated from each other and connected using different first traces to reduce the aforementioned LGM interference signal, thereby enhancing the touch sensitivity.

For reference, the principle of generating the LGM interference signal is as described above with reference to FIGS. 6a, 6b and 7.

Meanwhile, in the present invention, the touch window area S may be defined as an area larger than the touch area of the other fingers, like the touch area of the thumb. Specifically, the area of the touch window area S may be implemented with approximately 15 mm*15 mm or more and approximately 20 mm*20 mm or less, but preferably, the area may be implemented in a size of approximately 16 mm*16 mm. In particular, FIGS. 5a to 7 illustrate that the area of the touch window area S is implemented in the size of approximately 16 mm*16 mm.

Specifically, the area of the unit cell (hatched portion in FIG. 7) may be implemented with approximately 4 mm (length)*2 mm (horizontal). Thus, in the case of FIG. 7, a vertical length of one RX electrode (the size of four unit cells) is approximately 16 mm, and a horizontal length is approximately 2 mm. In addition, a vertical length of one TX electrode (the size of one unit cell) is approximately 4 mm, and a horizontal length is approximately 2 mm. In particular, FIG. 7 illustrates that the area of the touch window area S is implemented in the size of approximately 16 mm*16 mm. For reference, since the vertical length of TX0 in column B1 is approximately 4 mm, the horizontal length is approximately 1 mm, and the vertical length of TX1 in column B6 is approximately 4 mm and the horizontal length is approximately 1 mm, the combined area of the two electrodes becomes the area of one unit cell.

In the case of FIG. 7, the touch window area S may include some RX0, RX3, RX4, and RX7 of the plurality of first electrodes RX0 to RX7 and some TX0, TX1, TX6, TX7, TX8, TX9, TX14, and TX15 of the plurality of second electrodes TX0 to TX3, TX4 to TX11, or TX12 to TX15. Specifically, the touch window area S may be constituted by four consecutive first electrodes RX0, RX3, RX4, and RX7 in the column direction among the plurality of first electrodes RX0 to RX7 and four consecutive second electrodes TX0, TX7, TX8, and TX15 or TX1, TX6, TX9, and TX14 in the row direction for the four first electrodes RX0, RX3, RX4, and RX7, respectively.

The 1-1-th electrode RX0 and the 1-2-th electrode RX1 may be arranged in the first electrode array A1. A 2-4' electrode TX15, a 2-3' electrode TX8, a 2-2' electrode TX7, and a 2-1' electrode TX0 may be arranged to correspond adjacent to a 24 electrode TX0, a electrode TX7, a 2-3 electrode TX8, a 2-4 electrode TX15, and a 1-2 electrode RX1 corresponding adjacent to the 1-1 electrode RX0 in the second electrode array B2. In addition, the 2-1 electrode TX0 and the 1-1" electrode TX0 may be electrically connected to each other by using a 2-1 trace, the 2-2 electrode TX7 and the 2-2' electrode TX7 may be electrically connected to each other by using a 2-2 trace, the 2-3 electrode TX8 and the 2-3' electrode TX8 may be electrically connected to each other by using a 2-3 trace, and the 2-4 electrode TX15 and the 2-4' electrode TX15 may be electrically connected to each other by using a 2-4 trace. In addition, the mutual capacitance may be generated between the 1-1 electrode RX0 and the 2-1 electrode TX0 and the mutual capacitance may be generated between the 1-2 electrode RX1 and the 2-4' electrode TX15. Likewise, the mutual capacitance may be generated between the 1-1 electrode RX0 and the 2-2 electrode TX7, between the 1-1 electrode RX0 and the 2-3 electrode TX8, and between the 1-1 electrode RX0 and the 2-4 electrode TX15 and the mutual capacitance may be generated even between the 1-2 electrode RX1 and the 2-3' electrode TX8, between the 1-2 electrode RX1 and the 2-2' electrode TX7, and between the 1-2 electrode RX1 and the 24' electrode TX0.

However, such a feature is not applied only between column A1 and column B2 arranged on the right side of column A1, and may be applied even between column A1 and column B1 arranged on the left side of column A1 in the same/similar manner. In addition, such a feature is not applied only between column A1 and column B2 and may be applied even between the remaining first electrode array and the remaining second electrode array in the same/similar manner.

In this case, as illustrated in FIG. 7, a combination (or pair) of a coordinate of a predetermined first electrode TX0 and a coordinate of a predetermined second electrode RX0 or RX7 spaced apart from the first electrode TX0 by a predetermined distance in the touch window area S may be implemented not to be repeated in the same manner in the remaining touch areas other than the touch window area S. Specifically, a coordinate combination of a predetermined first electrode connected to the predetermined first electrode TX0 by using the first trace and a predetermined second electrode connected to the predetermined second electrode RX0 or RX7 by using the second trace may be implemented not to exist similarly in other window area. In this case, a pair of the predetermined first electrode TX0 and the predetermined second electrode RX0 or RX7 are arranged spaced apart from each other by a predetermined distance and a pair of the predetermined first electrode and the predetermined second electrode which do not exist in the other window area may be arranged adjacent to each other.

As a result, the '-' LGM interference signal may not be generated and the touch sensitivity may be enhanced and this will be described in detail in FIGS. 8a and 8b.

In the touch sensor panel 1 of FIG. 7, the second electrode array B2 may be arranged on one side of any one of the first electrodes RX0 and RX1 included in the first electrode array A1 and the other second electrode array B1 may be arranged on the other side. In addition, any one of the second electrodes TX0, TX7, TX8, and TX15 included in the second electrode array B2 and any one of the second electrodes TX0, TX7, TX8, and TX15 included in the other second electrode array B1 may be arranged in the same row around any one RX0 of the first electrodes RX0 and RX1. Here, any one of the second electrodes TX0, TX7, TX8, and TX15 included in the second electrode array B2 arranged in the same row and any one of the second electrodes TX0, TX7, TX8, and TX15 included in the other second electrode array B1 mean electrodes connected by using one second trace.

That is, two identical second electrodes having a relatively small size may be arranged adjacent to the left and right sides centering on the first electrode having a relatively large size. Each of two identical second electrodes may be arranged on the same line.

However, in FIG. 7, it is illustrated that the same second electrode having the relatively small size is arranged centering on the first electrode having the relatively large size, but according to another embodiment, the same first electrode having the relatively large size may be implemented to be arranged centering on the second electrode having the relatively small size.

In addition, although FIG. 7 illustrates that the second electrodes are arranged adjacent to the left and right sides around the first electrode, the second electrodes may be implemented to be arranged adjacent to each other on the upper and lower sides around the first electrode in some embodiments.

In addition, in FIG. 7, it is illustrated that the size of the second electrode (e.g., TX0) of the second electrode array B2 arranged around the first electrode (e.g., RX0 of the first electrode array A1 and the size of the second electrode (e.g., TX0) of the other second electrode array B1 are different, but according to another embodiment, the size of the second electrode (e.g., TX0) of the second electrode array B2 and the size of the second electrode (e.g., TX0) of the other second electrode array B1 may be implemented to be the same.

Meanwhile, in the above-described example, it is exemplified that any one of the second electrodes TX0, TX7, TX8, and TX15 included in the second electrode array B2 arranged in the same row and any one of the second electrodes TX0, TX7, TX8, and TX15 included in the other second electrode array B1 are connected by using one same second trace, but according to an embodiment, any one of the second electrodes TX0, TX7, TX8, and TX15 included in the second electrode array B2 arranged in the same row and any one of the second electrodes TX0, TX7, TX8, and TX15 included in the other second electrode array B1 may be implemented to be connected by using different second traces. That is, all of the second electrodes arranged on the same line on the left and right sides of the first electrode may be implemented to be different from each other.

In other words, the second electrodes arranged around the first electrode may be implemented to be all the same or different. When implemented as such, it is possible to improve the effect of splitting the result value of a capacitance signal due to the LGM interference signal compared to implementing some of the second electrodes arranged around the first electrode in the same manner and the remaining second electrodes differently.

The principle of improvement of the result value splitting effect of the capacitance signal is described above with reference to FIGS. 3e and 3c.

Meanwhile, as illustrated in FIG. 7, the touch sensor panel 1 may include the touch window area S and an adjacent touch area S' arranged adjacent to the touch window area S in the column direction among the remaining touch areas. In addition, the adjacent touch area S' is defined as an area having the same size as the touch window area S'.

In this case, each of the second electrodes TX0-TX7-TX8-TX15 included in the touch window area S among the second electrodes TX0-TX7-TX8-TX15-TX15-TX8-TX7-TX0 included in the second electrode array B2 may be repeatedly arranged like TX15-TX8-TX7-TX0 in the adjacent touch area S' among the second electrodes TX0-TX7-TX8-TX15-TX15-TX8-TX7-TX0 included in the second electrode array B2.

In other words, the same TX electrodes may be arranged in the column direction. In particular, as illustrated in FIG. 7, one TX15 of the second electrodes TX0-TX7-TX8-TX15 included in the touch window area S among the second electrodes TX0-TX7-TX8-TX15-TX15-TX8-TX7-TX0 included in the second electrode array B2 and one TX15 of the second electrodes TX15-TX8-TX7-TX0 in the adjacent touch area S' among the second electrodes TX0-TX7-TX8-TX15-TX15-TX8-TX7-TX0 included in the second electrode array B2 may be arranged adjacent to each other and the second electrodes TX15 and TX15 arranged adjacent to each other may be connected h using one second trace. In other words, it is possible to design the electrode arrangement form with a structure in which the TX electrodes are arranged in a first order in the touch window area S and arranged in a reverse order to the first order in the adjacent touch area S'.

However, although not illustrated in the figure, it is possible to design the electrode arrangement form with a structure in which the TX electrodes are arranged in the first order in the touch window area S and arranged in the same order as the first order even in the adjacent touch area S' according to another embodiment.

In this case, one TX15 of the second electrodes TX0-TX7-TX8-TX15 included in the touch window area S among the second electrodes TX0-TX7-TX8-TX15-TX0-TX7-TX8-TX15 included in the second electrode array B2 and one TX0 of the second electrodes TX0-TX7-TX8-TX15 in the adjacent touch area S' among the second electrodes TX0-TX7-TX8-TX15-TX0-TX7-TX8-TX15 included in the second electrode array B2 may be arranged adjacent to each other and the second electrodes TX15 and TX10 arranged adjacent to each other may be connected by using different second traces.

Meanwhile, as compared with the arrangement form of the touch sensor panel described above in FIG. 4g, the LGM interference signal is further reduced in the case of FIG. 7. That is, in addition to an LGM interference reduction effect due to separation of all first electrodes included in the touch window area S, in the case of FIG. 7, in addition to the effect, a result value acquired by multiplying the number of unit cells constituting the same driving electrode TX arranged in the touch area S by the object and the number of unit cells constituting the same receiving electrode RX is implemented to be minimized to reduce the effect of the LGM interference signal.

For example, in the case of FIG. 4g, it can be seen that the number of unit cells (hatched) constituting the same receiving electrode RX4 in the touch window area S is 4, and the number of unit cells constituting the same driving electrode TX1 is 4, and a product thereof is 4*4=16. For reference, here, the unit cell is defined as a region of the same size as the relatively small TX electrode.

On the other hand, in the case of FIG. 7, it can be seen that the number of unit cells (hatched) constituting the same receiving electrode RX4 in the touch window area S by the object is 4, and the number of unit cells constituting the same driving electrode TX0 is 2, and a product thereof is 4*2=8. For reference, here, the unit cell is defined as a region of the same size as the TX electrode having a relatively smaller size than the RX electrode. In the case of FIG. 7, since the number of unit cells is reduced by ½ compared to FIG. 3e, the magnitude of the LGM interference signal is also reduced by ½.

As a result, in the case of FIG. 7, the number of the same driving electrodes and/or the same receiving electrodes included in the touch window area S by the object is reduced, and a result value acquired by multiplying the number of unit cells constituting the same driving electrode TX arranged in the touch window area S by the object and the number of unit cells constituting the same receiving electrode RX is minimized to less than 16 (a predetermined value), and as a result, the effect of the LGM interference signal is reduced.

However, the predetermined value (16) is only an embodiment of the present invention, and the scope of the present invention is not limited thereto, and the predetermined value may be defined as various numerical values.

In FIGS. 8a and 8b, an example of an electrode pattern which prevents the '−' final capacitance change amount from being generated in addition to the LGM interference signal effect reduction and a principle thereof according to an embodiment of the present invention will be described.

For example, in the case of the electrode pattern of the touch sensor panel of FIG. 7, the '−' final capacitance change amount is not generated.

A location on the touch sensor panel 1, which is touched by the object is determined based on the final capacitance change amount (ΔCtotal) obtained as the object touches the touch sensor panel 1. The final capacitance change amount (ΔCtotal) is constituted by only '+' capacitance value (ΔCm, e.g., >+250) in the normal situation in which the low ground mass (LGM) interference signal is not generated, but a lower final capacitance change amount (ΔCtotal, e.g., 50) is obtained by the LGM interference signal ($C_{LGM}$, e.g., −200) in the situation in which the LGM interference signal is generated. That is, the LGM interference signal is defined as a signal that acts opposite to the '+' capacitance value, thereby reducing the finally obtained capacitance change amount (ΔCtotal).

On the other hand, as illustrated in FIGS. 8a and 8b, it can be seen that when the object touches a predetermined position S on the touch sensor panel 1 in which the driving electrode and the receiving electrode are arranged on the same layer, the final capacitance change amount (ΔCtotal) obtained at another position S' spaced apart from the touched position S is (minus). That is, when the touch by the object occurs at the touched position S, a '+' final capacitance change amount (ΔCtotal) is obtained, whereas a '−' (minus, hereinafter, simply expressed as only '−') final capacitance change amount (ΔCtotal) at another position S' spaced apart from the touched position is obtained. As a specific example, a reason for the phenomenon is as follows.

For example, it can be seen that in the case of the driving electrode TX9 included in the predetermined position S touched by the object, '+' capacitance value is obtained between the driving electrode TX9 and the receiving electrode RX 17 arranged immediately adjacent to the driving electrode TX9 and between the driving electrode TX9 and another receiving electrode RX25 arranged immediately adjacent to the driving electrode TX9, but final capacitance change amount (ΔCtotal, e.g., −200) is obtained in a state (i.e., in a state in which '+' capacitance value is '0') in which the '+' capacitance value is not obtained) between the driving electrode TX9 and the receiving electrode RX9 arranged spaced apart from the driving electrode TX9 by a predetermined distance and between the driving electrode TX9 and another receiving electrode RX1 arranged space apart from the driving electrode TX9 by a predetermined distance. The reason is that the '+' capacitance value is not obtained between the driving electrode and the receiving electrode which are not immediately adjacent to each other, and it may be determined that based on obtaining of the '−' final capacitance change amount (ΔCtotal, e.g., −200), the LGM interference signal (CLGM, e.g., −200) corresponding to the final capacitance change amount is generated at a position other than the touched position S.

The reason for generating the '−' LGM interference signal occurs when the driving electrode TX9 and the receiving electrodes RX9 and RX1 which are not adjacent to each other at the predetermined touch position S are adjacent to each other at another position S' as illustrated in FIG. 8a.

In other words, it means that a coordinate combination of the predetermined driving electrode and the receiving electrode extracted to determine mutual capacitance at a predetermined touch position S should not be repeated identically in other areas of the touch sensor panel 1.

According to the electrode pattern of the touch sensor panel 1 of FIG. 7 to which such a principle is applied, a combination (or pair) of a coordinate of a predetermined first electrode TX0 and a coordinate of a predetermined second electrode RX0 or RX7 spaced apart from the predetermined first electrode TX0 by a predetermined distance in the touch window area S may be implemented not to be repeated in the same manner in the remaining touch areas other than the touch window area. Specifically, a coordinate combination of a predetermined first electrode connected to the predetermined first electrode TX0 by using the first trace and a predetermined second electrode connected to the predetermined second electrode RX0 or RX7 by using the second trace may be implemented not to exist similarly in different window areas. In this case, a pair of the predetermined first electrode TX0 and the predetermined second electrode RX0 or RX7 are arranged spaced apart from each other by a predetermined distance and a pair of the predetermined first electrode and the predetermined second electrode which do not exist in the other window area may be arranged adjacent to each other.

As a result, as described above, the '−' LGM interference signal is not generated and the touch sensitivity may be enhanced.

Meanwhile, referring to FIG. 7, when a touch by an object occurs while a driving signal is applied to the touch sensor panel 1, a mutual capacitance signal value (ΔCm) is detected between a predetermined TX electrode and an RX electrode arranged adjacent to the predetermined TX electrode, but the mutual capacitance signal value (ΔCm) is not detected between the predetermined TX electrode and an RX electrode spaced apart from the predetermined TX electrode, and as a result, noise generated from an adjacent electrode may be eliminated by using a separate noise signal generated from a spaced electrode where the capacitance signal value ΔCm is not generated.

For example, the control unit 13 detects the mutual capacitance signal value (ΔCm) between TX0 of column B2 and TX0 of column B3 and RX3 of column A2 on the touch window area S, and also detects a predetermined display noise signal. On the other hand, between TX0 of column B2 and TX0 of column B3 and RX4 of column A3 or between TX0 of column B2 and TX0 of column B3 and RX7 of column A4, the mutual capacitance signal value (ΔCm) is not detected, but only a predetermined display noise signal is detected.

In other words, by subtracting a display noise signal value detected between TX0 of column B2 and TX0 of column B3 and RX4 of column A3 or between TX0 of column B2 and TX0 of column B3 and RX7 of column A4 from a signal value (mutual capacitance signal value (ΔCm)+display noise signal value) detected between TX0 of column B2 and TX0 of column B3 and RX3 of column A2, only a pure mutual capacitance signal value (ΔCm) may be obtained.

According to another embodiment, between TX0 of column B2 and TX0 of column B3 and RX4 of column A3 or TX0 of column B2 and TX0 of column B3 and RX7 of column A4, other noise signals (e.g., noise and/or LGM interference signal generated according to image conversion on the display) may also be generated in addition to the display noise signal value and in this case, only the pure mutual capacitance (ΔCm) may be obtained by subtracting the other noise signal value from the mutual capacitance signal value (ΔCm) generated between TX0 in column B2 and TX0 in column B3 and RX3 in column A2 and other noise signal value.

As a result, in a process of detecting the mutual capacitance signal value, it is possible to remove the noise from an actual reception channel by using a display noise signal detection characteristic of a dummy reception channel that is not used.

Meanwhile, in the above description, a case where the predetermined TX electrode is TX0 in column B2 and TX0 in column B3 is exemplified, but the scope of the present invention is not limited thereto, and when the conditions of the adjacent RX electrode and the spaced RX electrode are satisfied, the electrodes may be applied to other TX electrodes in the touch area S by the object in the same/similar manner. In addition, although the touch area S by the object is described in the above description, but the scope of the present invention is not limited thereto and the description may be applied to all regions in the touch sensor panel 1 in the same/similar manner.

In addition, the above description may be applied individually to the display noise signal value, the noise signal value generated by image conversion on the display, and the LGM interference signal value, but according to an embodiment, at least one of the display noise signal value, the noise signal value generated according to image conversion on the display, and the LGM interference signal value may be together applied.

Hereinabove, features, structures, effects, and the like described in the embodiments are included in one embodiment of the present invention, and are not particularly limited to only one embodiment. Further, features, structures, effects, and the like exemplified in each embodiment may be combined or modified for other embodiments by those skilled in the art to which the embodiments pertain. Therefore, the contents related to such combinations and modifications should be interpreted as being included in the scope of the present invention.

Further, although the embodiments have been mainly described above, these are merely examples and do not limit the present invention, and those skilled in the art to which the present invention pertains will know that various modifications and applications not illustrated above can be made within the scope without departing from the essential characteristics of the embodiment. For example, each component specifically shown in the embodiment may be implemented by being modified. In addition, it will be interpreted that differences related to the modifications and applications are included in the scope of the present invention defined in the appended claims.

INDUSTRIAL APPLICABILITY

According to an embodiment of the present invention, a phenomenon can be improved in which a signal detected by a low ground mass (LGM) disappears or a signal indicating that the touch occurs at two or more points appears in a touch sensor panel in which a driving electrode and a receiving electrode are disposed on the same layer. As a result, touch sensing performance can be improved.

Further, it is possible to enhance touch sensitivity out generating a negative final capacitance change amount.

In addition, by reducing the number of traces, the touch sensor panel can be manufactured to be slimmer, while manufacturing cost can be reduced.

The invention claimed is:

1. A touch sensor panel comprising:
   a plurality of first electrodes and a plurality of second electrodes,
   wherein a touch window area includes a first number of consecutive first electrodes in a first direction among the plurality of first electrodes and a second number of consecutive second electrodes in a second direction with respect to at least one of the first number of first electrodes to correspond to each other, and
   a value acquired by a multiplication of the number of unit cells constituting at least one first electrode connected to a first trace among the first electrodes included in the touch window area and the number of unit cells constituting at least one second electrode connected to a second trace among the second electrodes included in the touch window area is less than a predetermined value, wherein the predetermined value is 16.

2. The touch sensor panel of claim 1, further comprising:
   a plurality of first electrode arrays including the plurality of first electrodes and a plurality of second electrode arrays including the plurality of second electrodes,
   wherein at least two of the second electrodes included in the second electrode array which is any one of the plurality of second electrode arrays are arranged to correspond adjacent to any one of the first electrodes included in the first electrode array which is any one of the plurality of first electrode arrays,
   any one of the first electrodes included in the first electrode array is connected to some of the remaining first electrodes other than the any one first electrode among the plurality of first electrodes by using the first trace, and
   any one of the second electrodes included in the second electrode array is connected to some of the remaining second electrodes other than the any one second electrode among the plurality of second electrodes by using the second trace.

3. The touch sensor panel of claim 2, wherein the first electrodes included in the touch window area among the plurality of first electrodes are connected to different first traces, respectively.

4. The touch sensor panel of claim 2, wherein the second electrode array is arranged on one side of any one of the first electrodes included in the first electrode array and another second electrode array is arranged on the other side,
   any one of the second electrodes included in the second electrode array and any one of other second electrodes included in the other second electrode array are arranged in the same row around any one of the first electrodes, and
   any one of the second electrodes included in the second electrode array arranged in the same row and any one of the other second electrodes included in the other second electrode array are connected by using the second trace.

5. The touch sensor panel of claim 2, further comprising:
an adjacent touch area implemented to have the same size as the touch window area adjacent to the touch window area in a column direction,
in which each of the second electrodes included in the touch window area among the second electrodes included in the second electrode array is repeatedly arranged in the adjacent touch area among the second electrodes included in the second electrode array.

6. The touch sensor panel of claim 5, wherein one of the second electrodes included in the touch window area among the second electrodes included in the second electrode array and one of the second electrodes included in the adjacent touch area among the second electrodes included in the second electrode array are arranged adjacent to each other and the second electrodes arranged adjacent to each other are connected by using the second trace.

7. The touch sensor panel of claim 1, further comprising:
a control unit detecting whether a touch has occurred on a touch sensor including the plurality of first electrodes and the plurality of second electrodes,
wherein the control unit uses a predetermined noise signal value detected in a predetermined second electrode among the second electrodes included in the touch window area and some of the first electrodes spaced apart from the predetermined second electrode to detect only a mutual capacitance signal value acquired by excluding the predetermined noise signal among signal values detected in at least one first electrode adjacent to the predetermined second electrode.

8. The touch sensor panel of claim 7, wherein the predetermined noise signal value includes at least one of a display noise signal value, a noise signal value generated according to image conversion on a display, and a low ground mass (LGM) interference signal value.

9. A touch sensor panel comprising:
a plurality of first electrodes and a plurality of second electrodes,
wherein a touch window area includes a first number of consecutive first electrodes in a first direction among the plurality of first electrodes and a second number of consecutive second electrodes in a second direction with respect to at least one of the first number of first electrodes to correspond to each other, and
a value acquired by a multiplication of the number of unit cells constituting at least one first electrode connected to a first trace among the first electrodes included in the touch window area and the number of unit cells constituting at least one second electrode connected to a second trace among the second electrodes included in the touch window area is less than a predetermined value,
wherein a pair of a predetermined first electrode among the first electrodes included in the touch window area and a predetermined second electrode among the second electrodes do not exist in other window areas other than the touch window area.

10. The touch sensor panel of claim 9, further comprising:
a plurality of first electrode arrays including the plurality of first electrodes and a plurality of second electrode arrays including the plurality of second electrodes,
wherein at least two of the second electrodes included in the second electrode array which is any one of the plurality of second electrode arrays are arranged to correspond adjacent to any one of the first electrodes included in the first electrode array which is any one of the plurality of first electrode arrays,
any one of the first electrodes included in the first electrode array is connected to some of the remaining first electrodes other than the any one first electrode among the plurality of first electrodes by using the first trace, and
any one of the second electrodes included in the second electrode array is connected to some of the remaining second electrodes other than the any one second electrode among the plurality of second electrodes by using the second trace.

11. The touch sensor panel of claim 10, wherein the first electrodes included in the touch window area among the plurality of first electrodes are connected to different first traces, respectively.

12. The touch sensor panel of claim 10, wherein the second electrode array is arranged on one side of any one of the first electrodes included in the first electrode array and another second electrode array is arranged on the other side,
any one of the second electrodes included in the second electrode array and any one of other second electrodes included in the other second electrode array are arranged in the same row around any one of the first electrodes, and
any one of the second electrodes included in the second electrode array arranged in the same row and any one of the other second electrodes included in the other second electrode array are connected by using the second trace.

13. The touch sensor panel of claim 10, further comprising:
an adjacent touch area implemented to have the same size as the touch window area adjacent to the touch window area in a column direction,
in which each of the second electrodes included in the touch window area among the second electrodes included in the second electrode array is repeatedly arranged in the adjacent touch area among the second electrodes included in the second electrode array.

14. The touch sensor panel of claim 13, wherein one of the second electrodes included in the touch window area among the second electrodes included in the second electrode array and one of the second electrodes included in the adjacent touch area among the second electrodes included in the second electrode array are arranged adjacent to each other and the second electrodes arranged adjacent to each other are connected by using the second trace.

15. The touch sensor panel of claim 9, further comprising:
a control unit detecting whether a touch has occurred on a touch sensor including the plurality of first electrodes and the plurality of second electrodes,
wherein the control unit uses a predetermined noise signal value detected in a predetermined second electrode among the second electrodes included in the touch window area and some of the first electrodes spaced apart from the predetermined second electrode to detect only a mutual capacitance signal value acquired by excluding the predetermined noise signal among signal values detected in at least one first electrode adjacent to the predetermined second electrode.

16. The touch sensor panel of claim 15, wherein the predetermined noise signal value includes at least one of a display noise signal value, a noise signal value generated according to image conversion on a display, and a low ground mass (LGM) interference signal value.

* * * * *